(12) United States Patent
Ogasahara et al.

(10) Patent No.: US 7,385,730 B2
(45) Date of Patent: Jun. 10, 2008

(54) IMAGE PROCESSING APPARATUS, IMAGE PROCESSING METHOD, AND PRINTING APPARATUS AND PRINTING SYSTEM USING THE IMAGE PROCESSING APPARATUS

(75) Inventors: Takayuki Ogasahara, Rochester, NY (US); Hiroshi Tajika, Kanagawa (JP); Yuji Konno, Kanagawa (JP); Norihiro Kawatoko, Kanagawa (JP); Tetsuya Edamura, Kanagawa (JP); Tetsuhiro Maeda, Kawasaki (JP); Atsuhiko Masuyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1053 days.

(21) Appl. No.: 10/198,108

(22) Filed: Jul. 19, 2002

(65) Prior Publication Data

US 2003/0030824 A1 Feb. 13, 2003

(30) Foreign Application Priority Data

Jul. 31, 2001 (JP) ............................. 2001-232920

(51) Int. Cl.
*H04N 1/40* (2006.01)
*G06K 9/00* (2006.01)

(52) U.S. Cl. ........................ 358/3.01; 358/1.9; 358/1.8; 358/3.02; 358/3.06; 358/3.09; 358/3.1; 358/518; 358/2.1; 358/3.11; 358/3.14; 358/502; 358/3.23; 358/534; 358/520; 382/167; 382/270; 382/112

(58) Field of Classification Search ................ 358/1.9, 358/1.8, 1.1, 5, 461, 517, 354, 1.16, 404, 358/504, 3.01, 3.02, 3.06, 3.09, 3.1, 3.23, 358/3.13–3.18, 534–536, 2.1, 3.11, 502, 518, 358/519; 347/119, 129, 43, 55, 20; 345/590; 430/359; 400/323, 124; 101/93.04, 93; 382/112, 270, 167

See application file for complete search history.

(56) References Cited

U.S. PATENT DOCUMENTS 4,884,080 A * 11/1989 Hirahara et al. .............. 346/46

(Continued)

FOREIGN PATENT DOCUMENTS

EP 1 079 327 A2 2/2001

(Continued)

*Primary Examiner*—King Y. Poon
*Assistant Examiner*—S. Kau
(74) *Attorney, Agent, or Firm*—Fitzpatrick, Cella, Harper & Scinto

(57) ABSTRACT

In an apparatus for performing printing using a color ink-jet head having a plurality of ink-discharge-port strings corresponding to ink materials having different color tones, a high-quality image having excellent gradation can be recorded, while reducing the cost of the apparatus and increasing the data processing speed by reducing the capacity of a memory for storing dot arrangement patterns. For that purpose, as a plurality of dot arrangement patterns for determining dot arrangement at output within a M×N-dot region for one input pixel, (1) patterns having a large number of gradation levels that can be represented (for example, nine gradation levels) and a high recording resolution (for example, 1,200 dpi (dots per inch)×2,400 dpi) are used for colors in which uneven stripes tend to be pronouncedly observed (for example, light cyan and light magenta), and (2) patterns having a small number of gradation levels that can be represented (for example, five gradation levels) and a low recording resolution (for example, 1,200 dpi×1,200 dpi) are used for colors in which uneven stripes tend to be less pronouncedly observed (for example, black, cyan, magenta and yellow).

8 Claims, 25 Drawing Sheets

U.S. PATENT DOCUMENTS

| | | | |
|---|---|---|---|
| 5,729,358 A * | 3/1998 | Uchiyama et al. | 358/451 |
| 6,024,438 A * | 2/2000 | Koike et al. | 347/43 |
| 6,163,384 A * | 12/2000 | Kato | 358/404 |
| 6,215,424 B1 | 4/2001 | Cooper | 341/67 |
| 6,336,706 B1 * | 1/2002 | Otsuki | 347/43 |
| 6,439,683 B1 * | 8/2002 | Matsumoto et al. | 347/15 |
| 6,693,727 B1 * | 2/2004 | Kanno et al. | 358/3.03 |
| 7,057,756 B2 * | 6/2006 | Ogasahara et al. | 358/1.15 |
| 2001/0026723 A1 * | 10/2001 | Otsuka et al. | 400/323 |
| 2002/0021319 A1 | 2/2002 | Kawatoko et al. | 347/15 |
| 2002/0067519 A1 * | 6/2002 | Suzuki et al. | 358/519 |

FOREIGN PATENT DOCUMENTS

| | | |
|---|---|---|
| JP | 2000-216687 | 8/2000 |
| JP | 2000-216694 | 8/2000 |
| JP | 2001-63016 | 3/2001 |
| JP | 2002-29097 | 1/2002 |

* cited by examiner

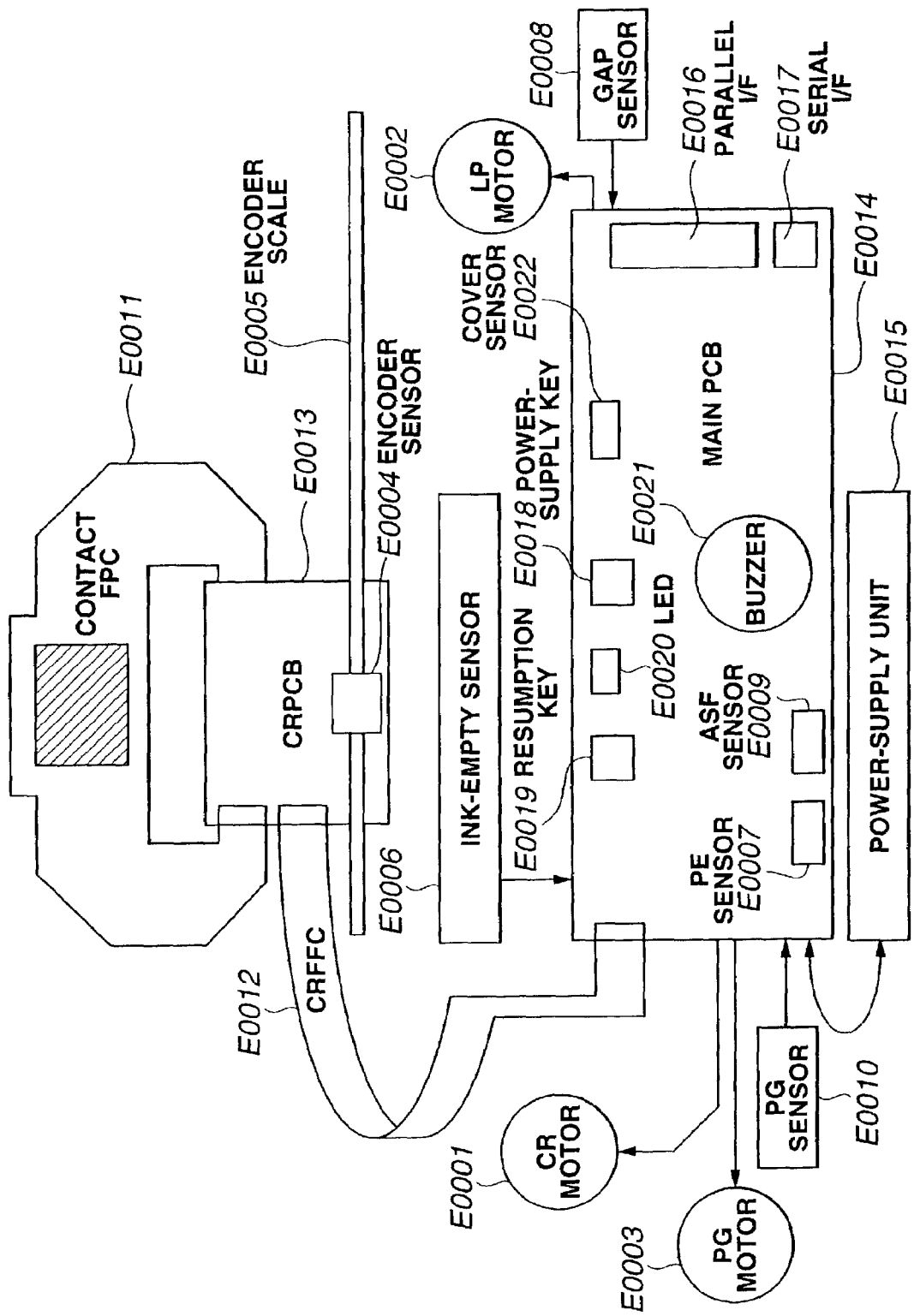

100% INK PROVISION

200% INK PROVISION

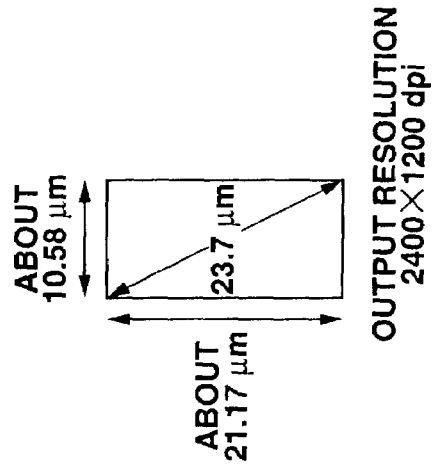
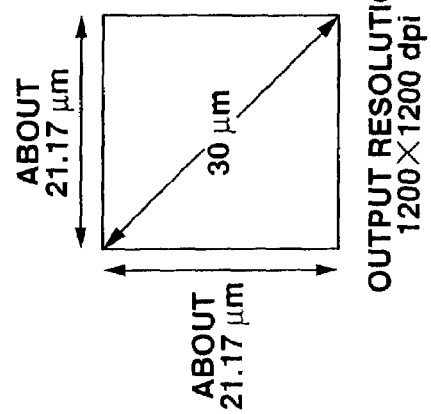
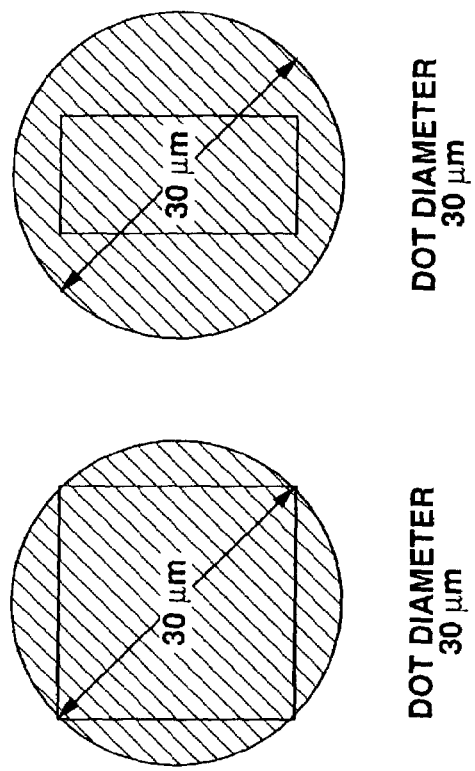
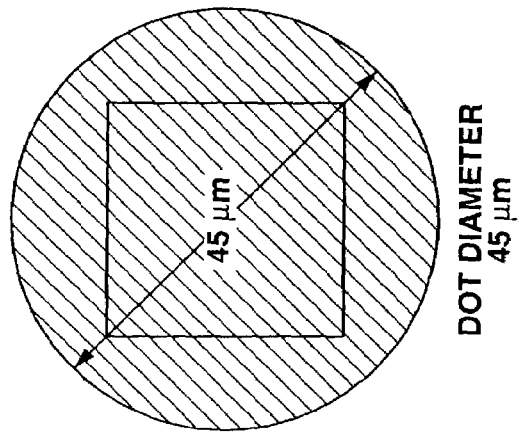

FIG.20

Cyan/Magenta/Yellow/Black

2400dpi

Light Cyan/Light Magenta

FIG.24

BINARY PROCESSING

MULTIVALUE PROCESSING

IMAGE PROCESSING APPARATUS, IMAGE PROCESSING METHOD, AND PRINTING APPARATUS AND PRINTING SYSTEM USING THE IMAGE PROCESSING APPARATUS

BACKGROUND OF THE INVENTION

1. Field of the Invention

The present invention relates to an image processing apparatus and an image processing method, and a printing apparatus and a printing system using the image processing apparatus. More particularly, the invention is suitably applied to a printing apparatus for printing a color image using a plurality of types of printing materials having different color tones, and an image processing method for the printing apparatus. The present invention may be applied not only to an ordinary printing apparatus, but also to any other appropriate apparatus, such as a copier, a facsimile apparatus having a communication system, a word processor having a printing unit, or the like, or to an industrial recording apparatus combined with various types of processing apparatuses.

2. Description of the Related Art

A printer is known as a printing apparatus for recording information, including desired characters, images or the like, on a sheet-shaped printing medium, such as paper, a film or the like, that serves as an information output apparatus for a word processor, a personal computer, a facsimile apparatus or the like.

Various types of conventional printing methods by a printer are known. Recently, ink-jet printing has become important because it has various advantages over other printing methods, such as, for example, the capability to perform non-contact printing on a printing medium, such as paper or the like, to easily form a color image, and to perform silent printing. A so-called serial method, in which printing is performed by mounting an ink-discharging print head in accordance with desired print information and scanning a printing medium, such as paper or the like, with the print head in a direction (a main scanning direction) orthogonal to a conveying direction (a sub-scanning direction) of the print medium, has been widely utilized as the configuration of a printing scanning system of the printing apparatus to which the ink-jet method is applied, because an inexpensive and small apparatus can be easily obtained.

In conventional ink-jet printing apparatuses, dots are recorded according to binary-encoding processing or multivalue-encoding processing.

Recently, as a result of increasing popularity and availability of digital cameras having pixels exceeding three million in number, and realization of high picture quality in image input apparatuses, such as high-resolution scanners and the like, the amount of data to be processed by an output apparatus is increasing, and high accuracy in printing is required for a high-resolution image.

FIG. 26 is a graph illustrating the human visual characteristic (a VTF curve) with respect to gradations. The human visual characteristic indicates the number of gradations that can be discriminated by a human being at a certain observation distance (25 cm). If the capability to reproduce gradations of a printing apparatus is superior to the human visual characteristic, it can be said that the printing apparatus has an excellent gradation reproducing capability.

As is apparent from FIG. 26, when comparing the gradation reproducing capability of a printer performing encoding processing to various values of the human visual characteristic, the range exceeding the human visual characteristic easily widens as the number of encoding values increases. For example, in order to provide a gradation reproducing capability equivalent to multivalue encoding (septenary encoding) for input data having a resolution of 600 ppi (pixels per inch, reference value), binary encoding is necessary for input data with a resolution of 1,500 ppi. Accordingly, the gradation reproducing capability can be easily widened by performing multivalue(septenary)-encoding processing for input data having a resolution of 600 ppi than by performing binary encoding processing.

Multivalue-encoding processing will be briefly described with reference to FIGS. 27A and 27B. If it is assumed that a printing apparatus has an output resolution of 1,200×1,200 dpi (dots per inch, reference value) in the main scanning direction and in the sub-scanning direction, in binary-encoding processing shown in FIG. 27A, an input resolution of 1,200 ppi is required, and two gradations are represented by presence/absence of formation of one dot for an input pixel having a size of about 21.17 μm (1/1,200 inch) square. On the other hand, in quinary-encoding processing shown in FIG. 27B, five gradations are represented by presence/absence of formation of 2×2 =4 dots for an input pixel having a size of about 42.33 μm (1/600 inch) square. Accordingly, when performing quinary-encoding processing, input data can be reduced to ¼ of that when performing binary-encoding processing. That is, for a request for a print having high picture quality, while a high input resolution is necessary and the amount of data increases in binary-encoding processing, a relatively low input resolution is necessary and the amount of data decreases as the number of encoding values increases.

Unevenness sometimes results, for example, when moving a print head in the main scanning direction, due to errors in production of a scanning system of a printer main body, and the like (hereinafter termed "main-body noise"). Furthermore, when providing two discharging-port columns for discharging ink in the main scanning direction by being shifted by ½ of the pitch of arrangement of discharging ports in the sub-scanning direction (the sheet feeding direction), causing discharging ports of respective columns to perform recording of even-numbered rasters and odd-numbered rasters, deviation (in even/odd registration) in the position of ink provision (the dot forming position) is sometimes produced between even-numbered rasters and odd-numbered rasters.

A printing apparatus performing binary processing tends to be influenced by such main-body noise and head noise. In a printer performing multivalue processing, however, as disclosed, for example, in Japanese Patent Application Laid-Open (Kokai) No. 2001-63016 (2001), by indexing a plurality of patterns, each for determining a dot arrangement at output within a M×N-dot region for one input pixel, and selecting an appropriate pattern, the influence of main-body noise and head noise can be reduced.

Because of the above-described reasons, in recent ink-jet printing apparatuses, multivalue processing using a dot-pattern index (hereinafter termed "index processing") tends to be used instead of binary processing.

As described above, multivalue processing has advantages such as, for example, only a relatively low input resolution is required and the amount of data can be reduced, and the influence of main-body noise and head noise can also be reduced, compared with binary processing.

However, it is necessary to provide dot patterns, whose number equals the number of recording gradations, each of which determines dot arrangement in accordance with the number of recording gradations in a predetermined region. Furthermore, in order to mitigate the influence of main-body noise and head noise, it is necessary to provide a plurality of dot arrangement patterns in a predetermined region even at the same gradation. Still further, if the number of recording gradations is increased in order to improve the image quality, it is also necessary to increase the capacity of a memory for storing a table of patterns.

Recently, the use of a printer which provides not only a black or another monochrome print, but also a color print or a high-quality print using photo-ink materials (comprising four primary color ink materials and light-color ink materials of predetermined colors) has been generalized. In accordance with an increase in the types of ink materials, it is necessary to provide a dot-pattern table for each color tone, and a large-capacity memory (a ROM (read-only memory) or the like) for storing such tables, resulting in an increase in the cost of a printing apparatus. If the size of a dot-pattern table is simply reduced, banding unevenness between main scanning lines of the print head tends to be pronounced, thereby causing the possibility of a decrease in the image quality.

SUMMARY OF THE INVENTION

The present invention has been made in consideration of the above-described problems. It is an object of the present invention to provide a printing apparatus and an image processing method in which a high-quality image can be formed while reducing the capacity of a memory for storing dot-arrangement patterns.

In one aspect of the present invention, an image processing apparatus that processes image data applied in a printing apparatus that forms images on a print medium using a plurality of print heads that form dots in different conditions, the apparatus includes processing means for performing, on pixel data of an image to be printed, multivalue processing which represents at least two types of gradation representations in accordance with the different conditions, the at least two types of gradation representations having a different number of gradation levels and storage means for storing each dot pattern used for multivalue processing which represents a corresponding gradation level, for at least each of the at least two types of gradation representations, wherein recording resolutions differ between dot patterns representing one of the at least two gradation representations having one number of gradation levels and dot patterns for representing another gradation representation having another number of gradation levels.

In another aspect of the present invention, a print apparatus that forms images on a print medium using a plurality of print heads that form dots in different conditions, the apparatus includes an image processing apparatus that processes image data applied in a print apparatus that forms images on a print medium using a plurality of print heads that form dots in different conditions, includes (i) processing means for performing, on pixel data of an image to be printed, multivalue processing which represents at least two types of gradation representations in accordance with the different conditions, the at least two types of gradation representations having a different number of gradation levels and (ii) storage means for storing each dot pattern used for multivalue processing which represents a corresponding gradation level, for at least each of the at least two types of gradation representations and image formation control means for performing image formation based on dot patterns obtained by the multivalue processing performed by the image processing apparatus, wherein recording resolutions differ between dot patterns representing one of the at least two gradation representations having one number of gradation levels and dot patterns for representing another gradation representation having another number of gradation levels.

In still another aspect of the present invention, an image processing method of processing image data, applied to a print apparatus that forms images on a print medium using a plurality of print heads that form dots in different conditions, includes a processing step of (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations, wherein recording resolutions differ between dot patterns representing one of the at least two gradation representations having one number of gradation levels and dot patterns for representing another gradation representation having another number of gradation levels.

In yet another aspect of the present invention, a print method that forms images on a print medium using a plurality of print heads that form dots in different conditions, includes an image processing step (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations and an image formation step of performing image formation based on dot patterns obtained in the image processing step, wherein recording resolutions differ between dot patterns representing one of the at least two gradation representations having one number of gradation levels and dot patterns for representing another gradation representation having another number of gradation levels.

In still another aspect of the present invention, a print system includes a print apparatus that forms images on a print medium using a plurality of print heads that form dots in different conditions, the apparatus comprising an image processing apparatus that processes image data applied in a print apparatus that forms images on a print medium using a plurality of print heads that form dots in different conditions, the apparatus comprising (i) processing means for performing, on pixel data of an image to be printed, multivalue processing which represents at least two types of gradation representations in accordance with the different conditions, the at least two types of gradation representations having a different number of gradation levels and (ii) storage means for storing each dot pattern used for multivalue processing which represents a corresponding gradation level, for at least each of the at least two types of gradation representations, image formation control means for performing image formation based on dot patterns obtained by the multivalue processing performed by the image processing apparatus and a host apparatus for supplying the print apparatus with image data, wherein recording resolutions differ between dot patterns representing one of the at least two gradation representations having one number of gradation levels and dot patterns for representing another gradation representation having another number of gradation levels.

In still another aspect of the present invention, a storage medium storing a control program for causing a computer to execute an image processing method is disclosed, the method including a processing step of (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations, wherein recording resolutions differ between dot patterns representing one of the at least two gradation representations having one number of gradation levels and dot patterns for representing another gradation representation having another number of gradation levels.

In still another aspect of the present invention, a storage medium storing a control program for causing a print apparatus to execute a print method is disclosed, the method including an image processing step (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations and an image formation step of performing image formation based on dot patterns obtained in the image processing step, wherein recording resolutions differ between dot patterns representing one of the at least two gradation representations having one number of gradation levels and dot patterns for representing another gradation representation having another number of gradation levels.

In still another aspect of the present invention, a control program for causing a computer to execute an image processing method is disclosed, the method including a processing step of (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations, wherein recording resolutions differ between dot patterns representing one of the at least two gradation representations having one number of gradation levels and dot patterns for representing another gradation representation having another number of gradation levels.

In still another aspect of the present invention, a control program for causing a print apparatus to execute a print method is disclosed, the method including an image processing step (i) performing, on pixel data of an image to be printed, multivalue processing which represents at least two types of gradation representations in accordance with the different conditions, the at least two types of gradation representations having a different number of gradation levels, and (ii) selecting a dot pattern from storage means for storing each dot pattern used for multivalue processing which represents a corresponding gradation level, for each of the at least two gradation representations and an image formation step of performing image formation based on dot patterns obtained in the image processing step, wherein recording resolutions differ between dot patterns representing one of the at least two gradation representations having one number of gradation levels and dot patterns for representing another gradation representation having another number of gradation levels.

As described above, according to the present invention, for example, when performing color recording using recording materials having a plurality of color tones, by utilizing the fact that unevenness among stripes tends to be easily observed and hardly observed depending on colors in the human visual characteristic, high-resolution recording (using large-size dot patterns) and low-resolution recording (using small-size dot patterns) are performed for colors of the former case and for colors of the latter case, respectively. As a result, it is possible to reduce the capacity of a pattern table, increase the data processing speed and reduce the cost of the apparatus, while maintaining the same image quality as when using large-size dot patterns for all color tones.

The foregoing and other objects, advantages and features of the present invention will become more apparent from the following description of the preferred embodiments taken in conjunction with the accompanying drawings.

BRIEF DESCRIPTION OF THE DRAWINGS

FIG. 7 is a schematic block diagram illustrating the entire configuration of electric circuitry in the first embodiment;

FIG. 14A illustrates patterns for five-value index processing for deep color ink; and FIG. 14B illustrates patterns for nine-value index processing for light color ink;

FIGS. 15A-15E are diagrams illustrating processing when heads having different dot diameters are used, in a second embodiment of the present invention;

FIG. 20 is a diagram illustrating patterns for index processing according to a third embodiment of the present invention;

FIGS. 21A and 20B are diagrams illustrating recording resolutions for deep color ink and light color ink, respectively, in the third embodiment;

FIG. 24 is a diagram illustrating a pattern for index processing according to a fourth embodiment of the present invention;

DESCRIPTION OF THE PREFERRED EMBODIMENTS

A recording apparatus according to a preferred embodiment of the present invention will now be described with reference to the drawings.

In the following embodiment, a description will be provided illustrating a printer as a recording apparatus using an ink-jet recording method.

In the description that follows, the word "print" (also termed "recording") indicates both a case in which information including characters, figures or the like is formed, and a case in which an image, a figure, a pattern or the like is formed on a print medium, or the medium is processed, irrespective of whether a human being is capable of sensing the information or not.

In the description that follows, the word "print medium" or "recording sheet" indicates both paper used in a conventional print apparatus, and a substance that can receive ink, such as cloth, a plastic film, a metal plate, glass, ceramics, wood, leather or the like. In the following description, however, a print medium is also sometimes called a "recording medium" or simply "paper".

In the description that follows, the word "ink" (sometimes also termed a "liquid") is to be interpreted in context with the above-described definition of "print", and indicates a liquid that can be used for forming an image, a figure, a pattern or the like, processing a print medium, or processing ink (for example, solidification or provision of insolubility of a color material within ink supplied to a print medium).

1. Apparatus Main Body

Figure 1:
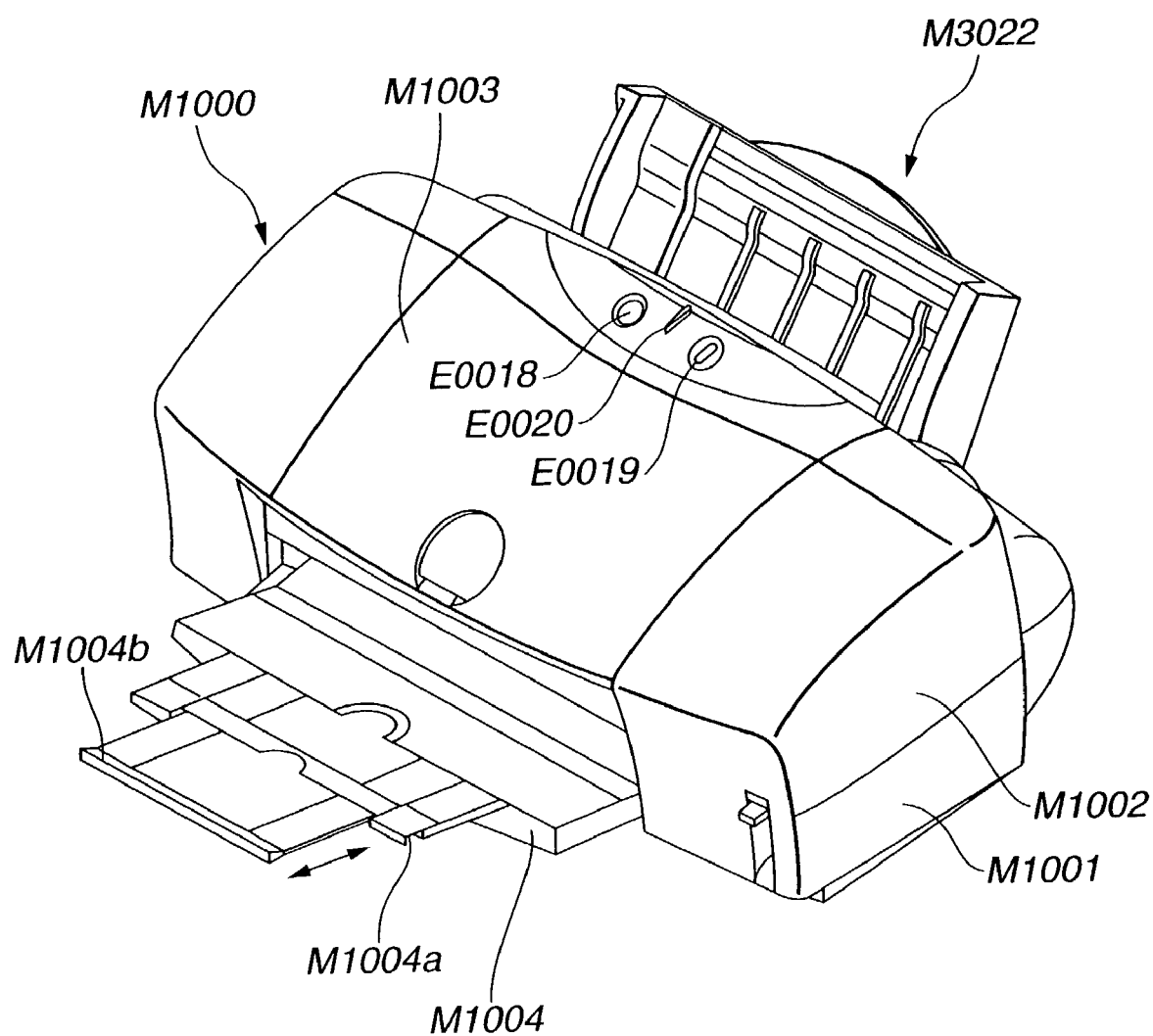
FIG. 1 is a perspective view illustrating an external appearance and the configuration of an ink-jet printer according to a first embodiment of the present invention.
Figure 2:
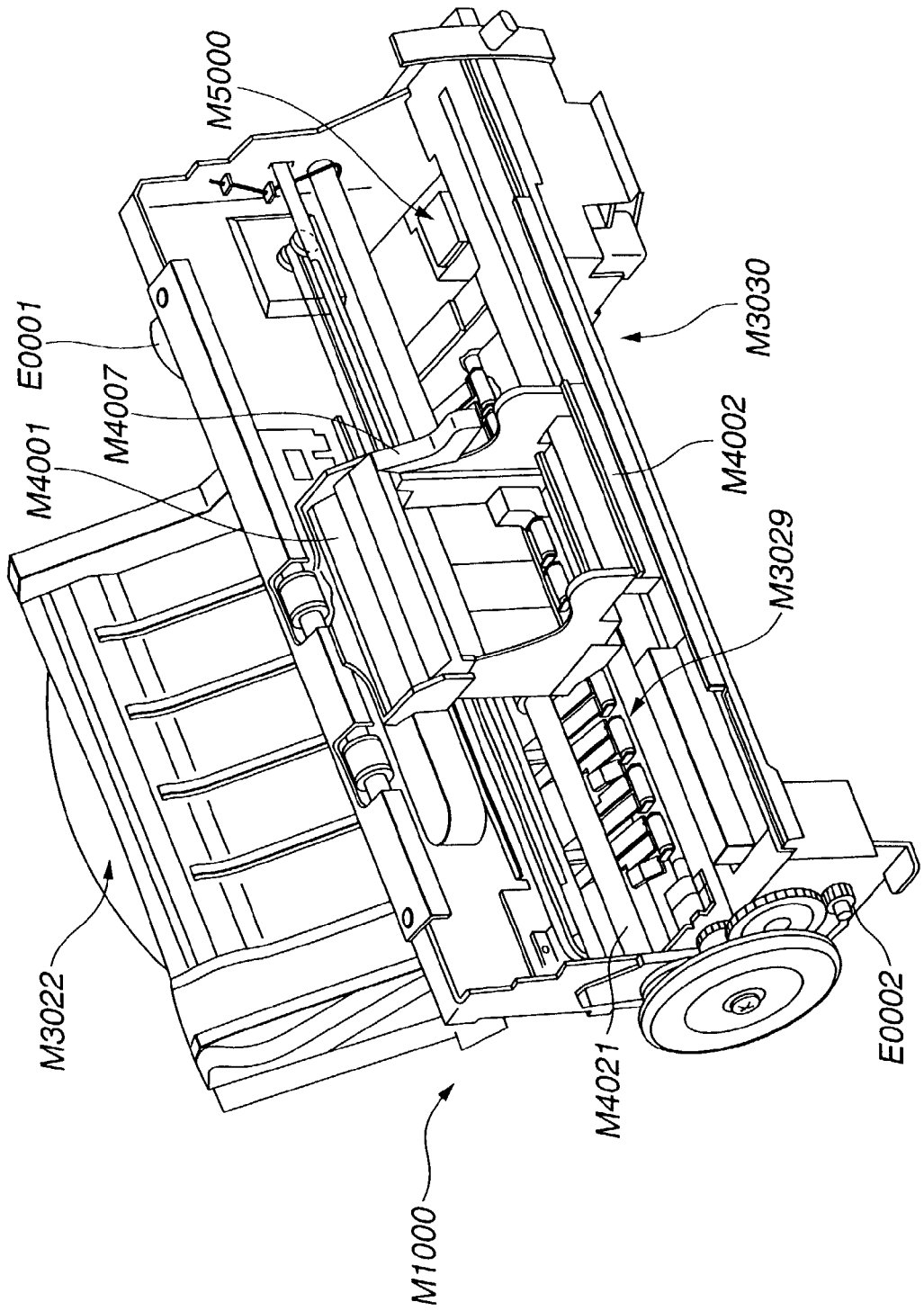
FIG. 2 is a perspective view illustrating a state in which outer members are removed from the ink-jet printer shown in FIG. 1.

FIGS. 1 and 2 illustrate the schematic configuration of a printer using an ink-jet recording method according to a first embodiment of the present invention. In FIG. 1, an outer hull of a main body M1000 of the printer includes outer members comprising a lower case M1001, an upper case M1002, an access cover M1003, a discharge tray M1004, and a chassis M3019 (shown in FIG. 2) accommodated within the outer members.

The chassis M3019 is made of a plurality of plate-shaped metal members having predetermined rigidity, serves as a skeleton of the recording apparatus, and holds respective recording operation mechanisms (to be described later).

The lower case M1001 and the upper case M1002 constitute a substantially lower half portion and a substantially upper half portion, respectively of the outer hull of the apparatus main body M1000, and a hollow structure having an accommodating space for accommodating the respective mechanisms is provided by combining the two cases. An opening is formed in each of an upper portion and a front portion of the apparatus main body M1000.

One end portion of the discharge tray M1004 is rotatably held on the lower case M1001. By rotation of the discharge tray M1004, the size of the opening formed in the front portion of the lower case M1001 can be increased/decreased. Accordingly, when executing a recording operation, by increasing the opening by rotating the discharge tray M1004 toward the front side, a recording sheet can be discharged from the opening, and discharged recording sheets can be sequentially accumulated on the discharge tray M1004. Two auxiliary trays M1004a and M1004b are accommodated within the discharge tray M1004. By drawing each tray toward the front side whenever necessary, the supporting area for the sheets can be enlarged/reduced in three stages.

One end portion of the access cover M1003 is rotatably held on the upper case M1002, and an opening formed in the upper surface of the upper case M1002 can be increased/decreased. By opening the access cover M1003, a recording head cartridge H1000, an ink tank H1900 or the like (shown in FIG. 3) accommodated within the apparatus main body M1000 can be exchanged. Although not illustrated in FIGS. 1 and 2, by opening/closing the access cover M1003, a projection formed at the inner surface of the access cover M1003 rotates a cover opening/closing lever. By detecting the position of rotation of the lever by a microswitch or the like, the opened/closed state of the access cover M1003 can be detected.

On a rear upper surface of the upper case M1002, there are provided a depressable power supply key E0018 and a depressable resumption key E0019, as well as an LED (light-emitting diode) E0020. By depressing the power-supply key E0018, the LED E0020 is lit to notify the operator that recording can be performed. The LED E0020 has various display functions, such as changing a flashing pattern, or the color, notifying the operator of a trouble in the printer, and the like. It is also possible to ring a buzzer E0021 (shown in FIGS. 7 and 8). Further, a print operation can be paused when trouble arises and, when a trouble or the like has been solved, recording is resumed by depressing the resumption key E0019.

2. Recording Operation Mechanism

Next, a recording mechanism accommodated and held in the apparatus main body M1000 of the printer, according to the first embodiment will be described.

Referring now to FIG. 2, the recording operation mechanism in the first embodiment includes an automatic feeding unit M3022 for automatically feeding individual recording sheets into the apparatus main body M1000, a conveying unit M3029 for guiding the recording sheet individually fed from the automatic feeding unit M3022 to a predetermined recording position, and further guiding the recording sheet from the recording position to a discharge unit M3030, a recording unit for performing desired recording on the recording sheet conveyed to the recording position, and a recovery unit M5000 for performing recovery processing for the recording unit or the like.

The recording unit includes a carriage M4001 movably supported on a carriage shaft M4021, and a recording head cartridge H1000 (not shown) detachably mounted on the carriage M4001.

2.1 Recording Head Cartridge

First, the recording head cartridge H1001 used in the recording unit will be described with reference to FIGS. 3-5.

Figure 3:
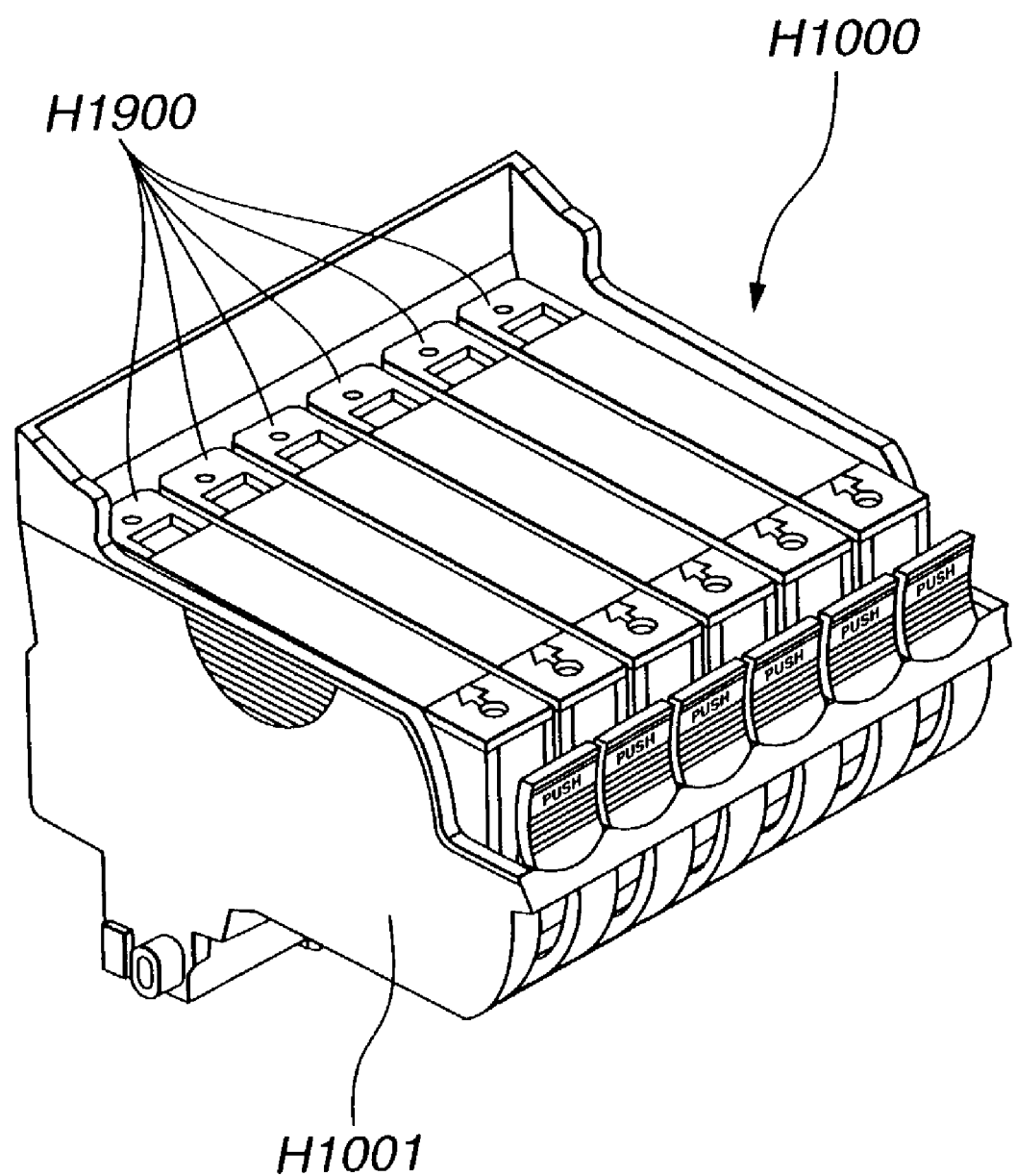
FIG. 3 is a perspective view illustrating a state in which a recording-head cartridge to be used in the first embodiment is assembled.
Figure 4:
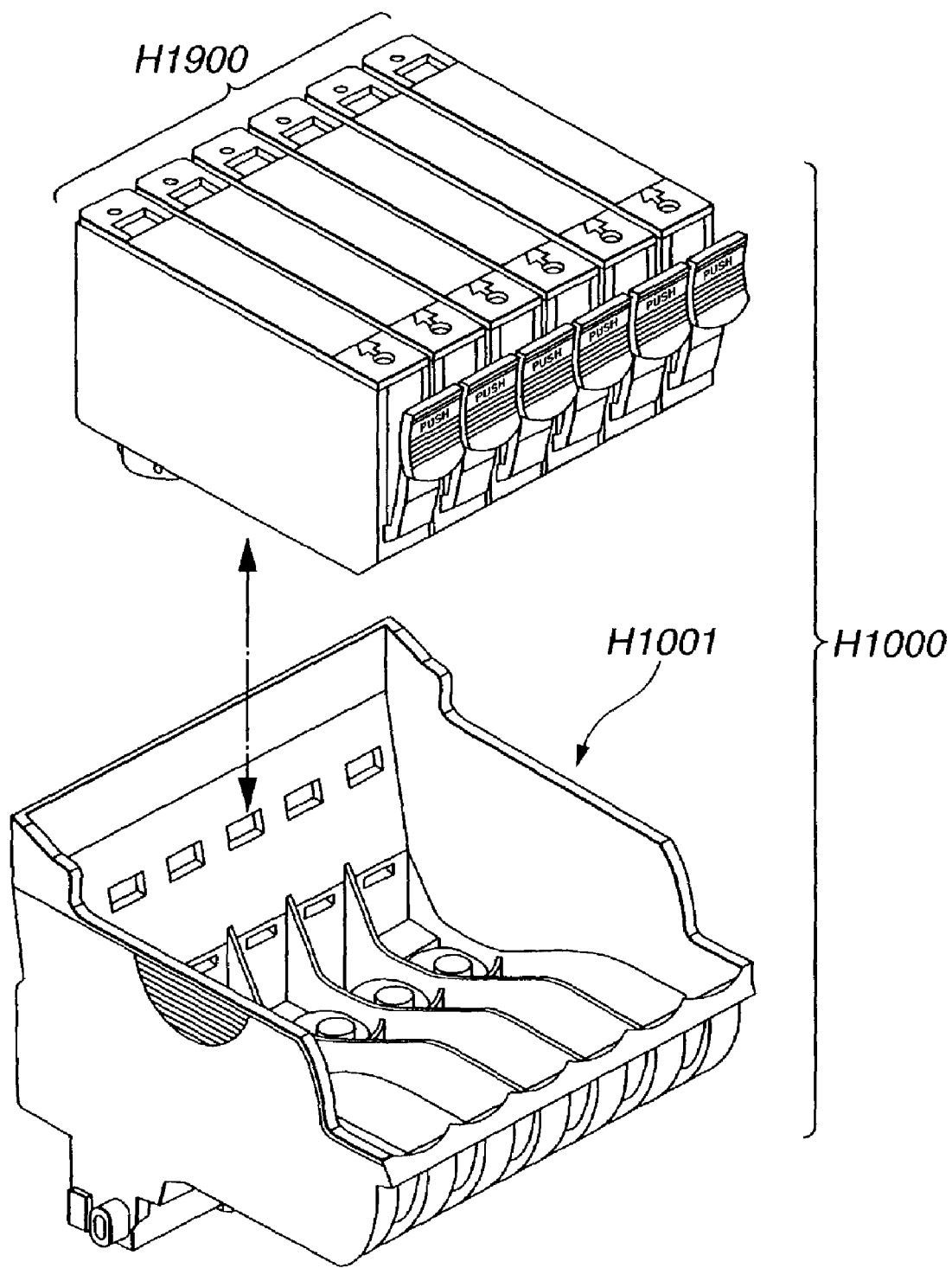
FIG. 4 shows exploded perspective views illustrating the recording-head cartridge shown in FIG. 3.

The recording head cartridge H1000 includes, as shown in FIG. 3, an ink tank H1900 for storing ink, and a recording head H1001 for discharging ink supplied from the ink tank H1900 from nozzles in accordance with recording information. A so-called cartridge type head that is detachably mounted in the carriage M4001 (to be described later) is adopted as the recording head H1001.

In the recording head cartridge H1000, in order to allow photographic high-picture-quality color recording, the independent ink tanks H1900 for respective colors, such as black, light cyan, light magenta, cyan, magenta and yellow, are provided. As shown in FIG. 4, each of the ink tanks H1900 is detachably mountable in the recording head H1001.

Figure 5:
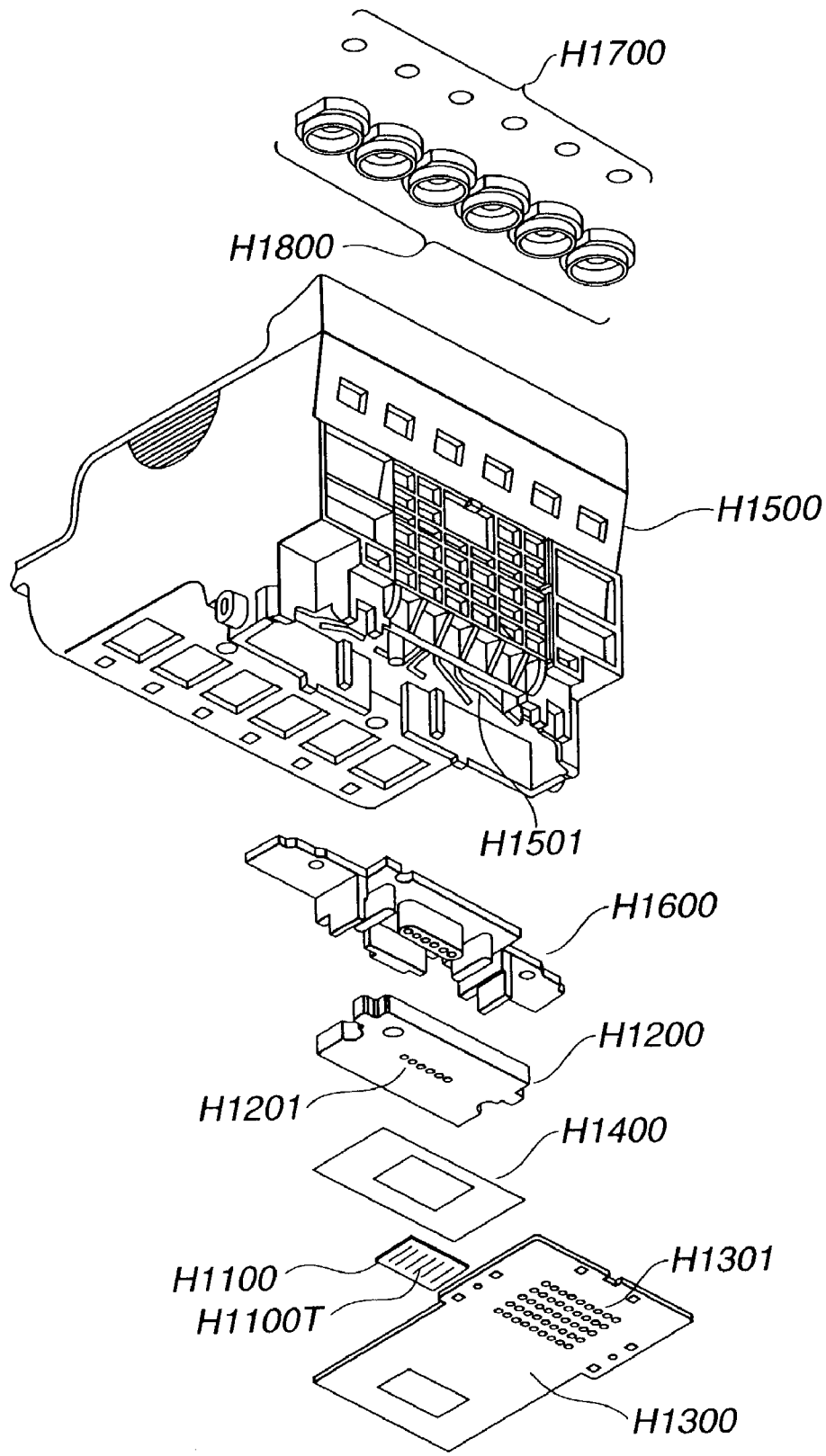
FIG. 5 shows exploded perspective views illustrating a recording head shown in FIG. 4, as seen from an oblique lower portion.

As shown in the exploded perspective view of FIG. 5, the recording head H1001 includes a recording element substrate H1100, a first plate H1200, an electric wire substrate H1300, a second plate H1400, a tank holder H1500, a liquid channel forming member H1600, filters H1700 and a seal rubber H1800.

On the recording element substrate H1100, a plurality of recording elements for discharging ink, and electric wires, made of Al or the like, for supplying each recording element with electric power are formed according to a film forming technique, a plurality of ink channels, and a plurality of discharge ports H1100T corresponding to the recording elements are formed according to photolithography on one surface of a Si substrate, and an ink supply port for supplying the plurality of ink channels with ink is opened at the back of the Si substrate. The recording element substrate H1100 is bonded and fixed on the first plate H1200, where ink supply ports H1201 for supplying the recording element substrate H1100 with ink are formed. Furthermore, the second plate H1400 has an opening and is bonded and fixed on the first plate H1200. The electric wire substrate H1300 is held so as to be electrically connected to the recording element substrate H1100 via the second plate H1400. The electric wire substrate H1300 applies an electric signal for discharging ink to the recording element substrate H1100, and includes electric wires corresponding to the recording element substrate H1100, and an external signal input terminal H1301, provided at an end portion of the electric wires, for receiving an electric signal from the apparatus main body M1000. The external-signal input terminal H1301 is positioned and fixed on the back of the tank holder H1500 (to be described later).

On the tank holder H1500 for detachably holding the ink tank H1900, the liquid-channel forming member H1600 is fixed, for example, according to ultrasonic welding, to form an ink channel H1501 from the ink tank H1900 to the first plate H1200. The filters H1700 are provided at end portions near the ink tank H1900 of the ink channel H1501 engaged with the ink tank H1900, in order to prevent penetration of dust from the outside. The seal rubber H1800 is mounted at a portion engaged with the ink tank H1900, in order to prevent evaporation of ink from the engaged portion.

The recording head H1001 is obtained by combining a tank holder unit including the tank holder H1500, the liquid channel forming member H1600, the filters H1700 and the seal rubber H1800 in the above-described manner, and a recording-element unit including the recording-element substrate H1100, the first plate H1200, the electric-wire substrate H1300 and the second plate H1400, by means of bonding or the like.

2.2 Carriage

Next, The carriage M4001 mounting the recording head cartridge H1000 will be described with reference to FIG. 2.

As shown in FIG. 2, on the carriage M4001, there are provided a carriage cover M4002, engaged with the carriage M4001, for guiding the recording head H1001 to a predetermined mounting position on the carriage M4001, and a head setting lever M4007, engaged with the tank holder 1500 of the recording head H1001 (shown in FIG. 3), for pressing the recording head H1001 so as to be set to a predetermined mounting position. That is, the head setting lever M4007 is provided at an upper portion of the carriage M4001 so as to be rotatable around a head setting lever shaft. A head setting plate (not shown) urged by a spring is provided at a portion engaged with the recording head H1001. The recording head H1001 is mounted on the carriage M4001 by being pressed by the spring force of the spring.

On another engaged portion with the recording head H1001 of the carriage M4001, there is provided a contact flexible printed circuit cable (shown in FIG. 7, hereinafter termed a "contact FPC") E0011 at another engaged portion with the recording head H1001. Contact portions on the contact FPC E0011 and portions (the external-signal input terminal) H1301 (shown in FIG. 5) provided on the recording head H1001 electrically contact to each other, so as to allow transmission/reception of various types of information for recording, supply of electric power to the recording head H1001, and the like.

An elastic member (not shown) made of rubber or the like is provided between the contact portions of the contact FPC E0011 and the carriage M4001, in order to allow secure contact between the contact portions and the carriage M4001 by the elastic force of the elastic member and the pressing force of the spring of the head setting lever M4007. The contact FPC E0011 is connected to a carriage substrate E0013 mounted on the back of the carriage M4001 (shown in FIG. 7).

3. Scanner

The printer of the first embodiment may also be used as a reading apparatus by mounting a scanner on the carriage M4001 (shown in FIG. 2) instead of the recording-head cartridge H1000.

The scanner moves in the main scanning direction together with the carriage M4001 of the printer, in order to read an image of an original fed instead of the recording medium, during the movement. By alternately performing a reading operation in the main scanning direction and a feeding operation in the sub-scanning direction of the original, information relating to the image of one original can be read.

Figure 6B:
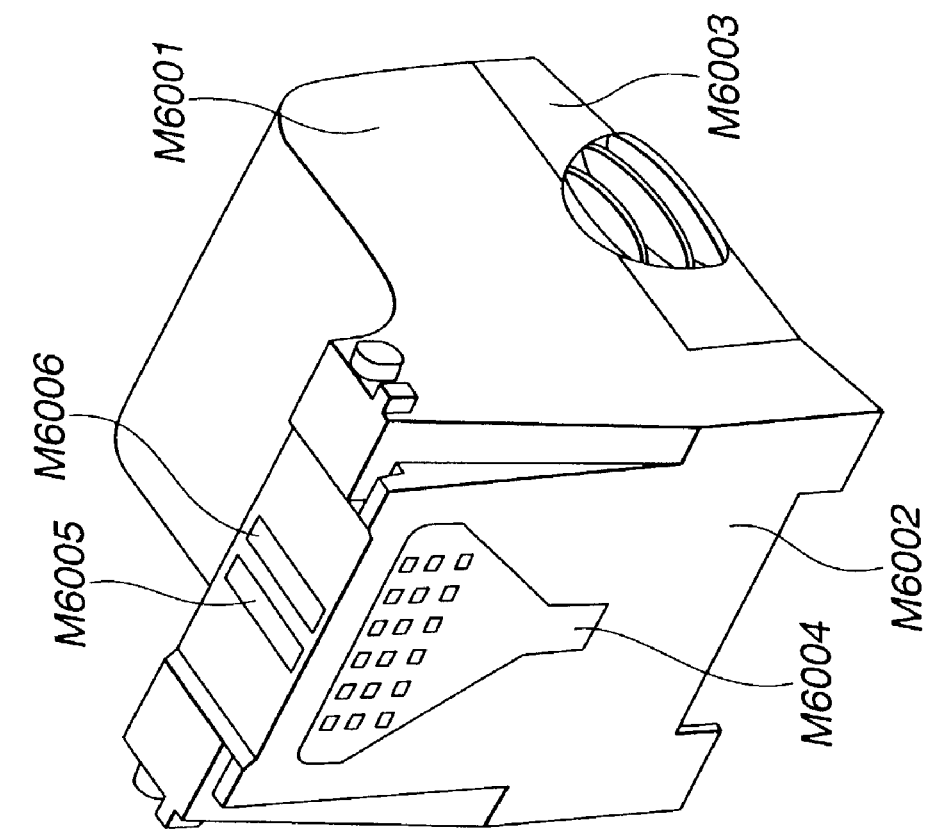
FIGS. 6A and 6B are perspective views illustrating a scanner cartridge in the first embodiment.
Figure 6A:
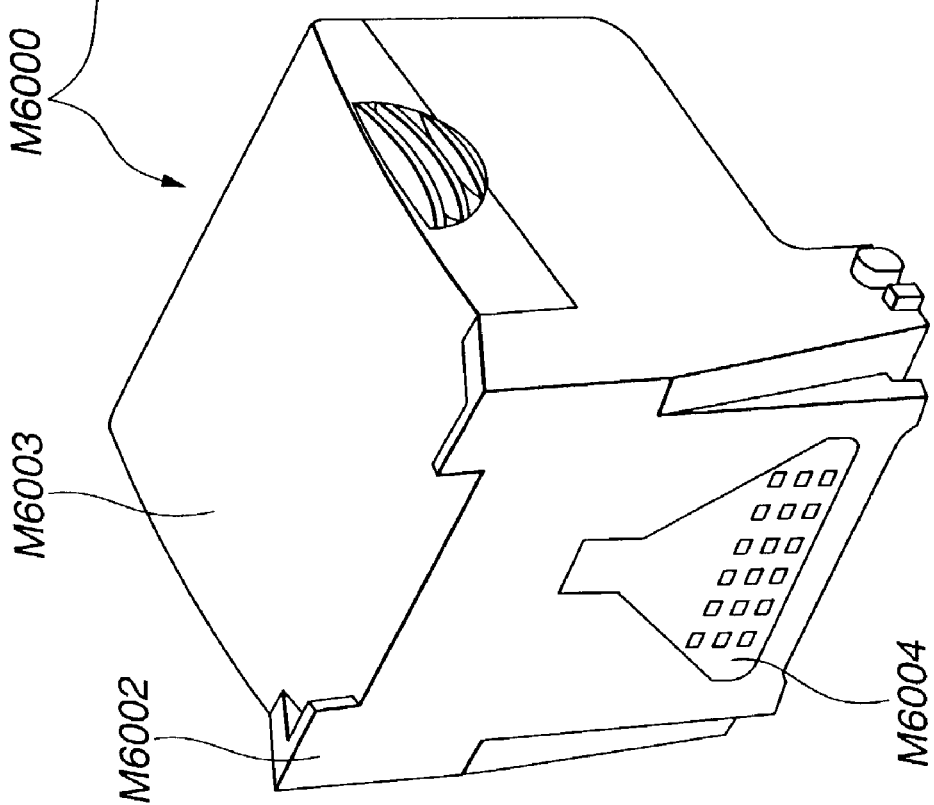

FIGS. 6A and 6B are schematic diagrams illustrating the configuration of the above-described scanner M6000, as seen from opposite sides.

As shown in FIGS. 6A and 6B, a scanner holder M6001 is substantially box-shaped, and incorporates an optical system, a processing circuit and the like necessary for reading. When mounting the scanner M6000 into the carriage M4001, a reading unit lens M6006 is provided at a portion facing the surface of an original document to be scanned. The image of the original is read by focusing reflected light from the surface of the original onto an internal reading portion. An illuminating unit lens M6005 incorporates a light source (not shown). Light from the light source is projected onto the original via the lens M6005.

A scanner cover M6003 fixed on the base of the scanner holder M6001 is fitted so as to perform light blocking of the inside of the scanner holder M6001. It is intended to improve the operability in detachable mounting of the scanner cover M6003 with respect to the carriage M4001 by means of a louver-shaped grasping unit provided at a side. The scanner holder M6001 has substantially the same outer shape as the recording head H1001, and can be detachably mounted in the carriage M4001 by an operation similar to the operation when mounting the recording-head cartridge H1000.

A substrate having a reading processing circuit is accommodated in the scanner holder M6001, and a scanner contact PCB (printed circuit board) M6004 connected to this substrate is exposed to the outside. When mounting the scanner M6000 in the carriage M4001, the scanner contact PCB M6004 contacts the contact FPC E0011 at the carriage M4001, so as to electrically contact the substrate to a control system of the apparatus main body M1000 via the carriage M4001.

4. Configuration of Electric Circuitry of the Printer

Next, a description will be provided of the configuration of electric circuitry in the first embodiment with reference to FIG. 7.

The electric circuitry in the first embodiment includes a carriage substrate (CRPCB) E0013, a main PCB E0014, a power-supply unit E0015, and the like. The power-supply unit E0015 is connected to the main PCB E0014, and supplies various types of driving electric power. The carriage substrate E0013 is a PCB unit mounted on the carriage M4001 (shown in FIG. 2). In addition to operating as an interface for transmitting/receiving signals with the recording head H1001 (not shown) via the contact FPC E0011, the carriage substrate E0013 detects changes in the positional relationship between an encoder scale E0005 and an encoder sensor E0004 based on a pulse signal output from the encoder sensor E0004 in accordance with the movement of the carriage M4001, and outputs an output signal to the main PCB E0014 via a flexible flat cable (CRFFC) E0012.

The main PCB E0014 is a PCB unit for controlling driving of respective units of the ink-jet recording apparatus of the first embodiment, and has I/O (input/output) ports for a paper-end detection sensor (PE sensor) E0007, an ASF (automatic sheet feeding) sensor E0009, a cover sensor E0022, a parallel interface (I/F) E0016, a serial interface (I/F) E0017, the resumption key E0019, the LED E0020, the power supply key E0018, the buzzer E0021 and the like thereon. The main PCB E0014 is also connected to a motor (CR motor) E0001, serving as a driving source for causing the carriage M1400 to perform main scanning, a motor (LF motor) E0002, serving as a driving source for conveying a recording medium, and a motor (PG motor) E0003 used for a recording-head rotating operation and a sheet feeding operation, in order to control driving for these motors, and also has connection interfaces with an ink-empty sensor E0006, a GAP sensor E0008, a PG sensor E0010, the CRFFC E0012 and the power-supply unit E0015.

Figure 8:
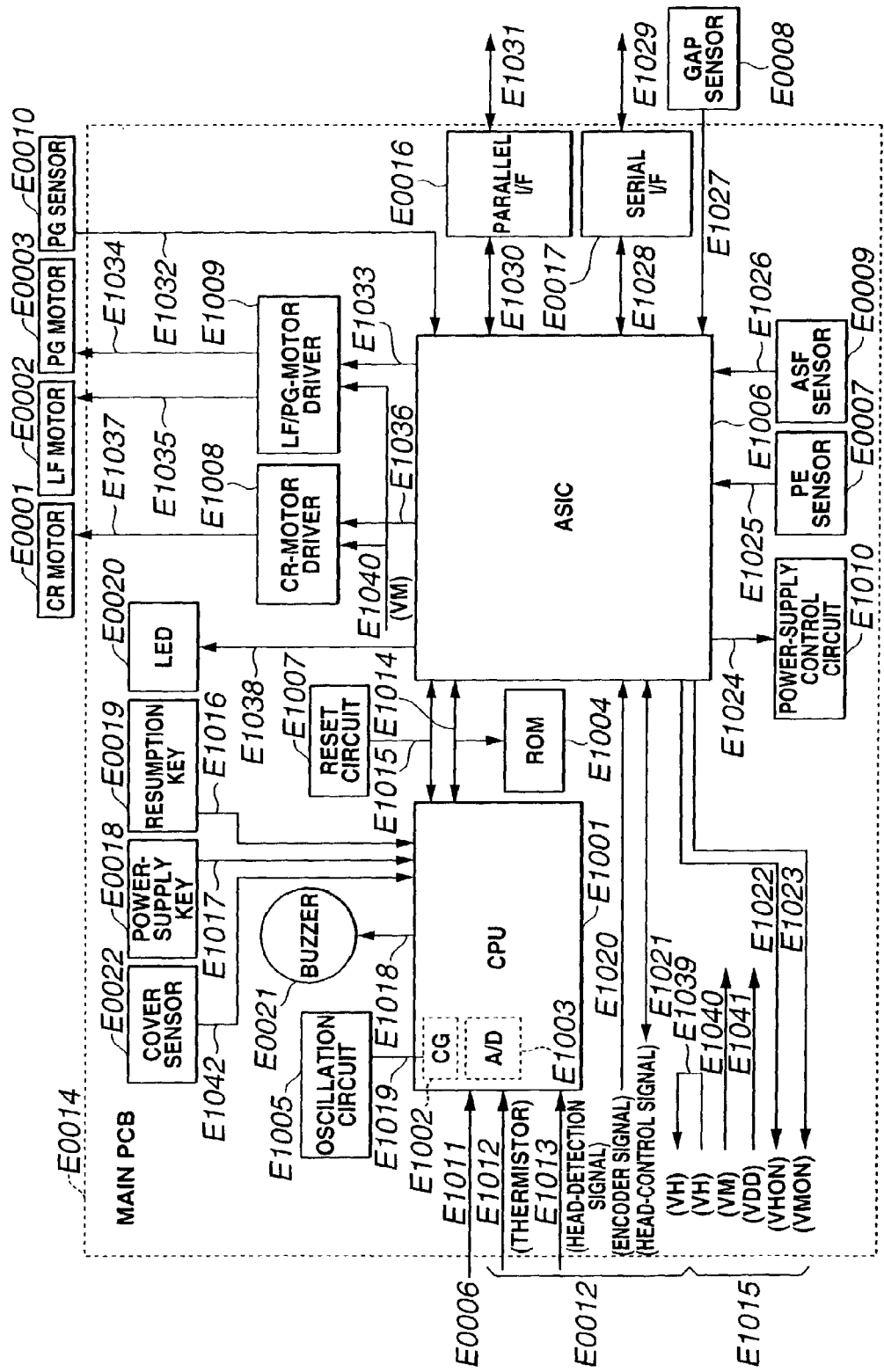
FIG. 8 is a block diagram illustrating the internal configuration of a main PCB (printed circuit board) shown in FIG. 7.

FIG. 8 is a block diagram illustrating the internal configuration of the main PCB E0014. In FIG. 8, a CPU (central processing unit) E1001 incorporates a clock-signal generator (CG) E1002 connected to an oscillation circuit E1005, and generates a system clock signal based on an output signal E1019 from the oscillation circuit E1005. The CPU E1001 is connected to a ROM (read-only memory) E1004 and an ASIC E1006 via a control bus E1014, and controls the ASIC E1006 and detects the states of an input signal E1017 from the power-supply key E0018, an input signal E1016 from the resumption key E0019, a cover detection signal E1042 and a head detection signal (HSENS) E1013 in accordance with a program stored in the ROM E1004, drives the buzzer E0021 (shown in FIG. 7) using a buzzer signal (BUZ) E1018, detects the states of an ink empty detection signal (INKS) E1011 connected to an incorporated A/D (analog-to-digital) converter E1003, and a temperature detection signal (TH) from a thermistor, and performs various logic calculations, determination of conditions, and the like, in order to control driving of the ink-jet recording apparatus.

The head detection signal E1013 is a head mounting detection signal input from the recording head cartridge H1000 (shown in FIGS. 3-5) via the flexible flat cable E0012, the carriage substrate E0013 and the contact FPC E0011. The ink-empty detection signal E1011 is an analog signal output from the ink-empty sensor E0006 (shown in FIG. 8). The temperature detection signal E1012 is an analog signal from a thermistor (not shown) provided on the carriage substrate E0013.

A CR-motor driver E1008 uses a motor power supply (VM) E1040 as the driving source, and generates a CR-motor driving signal E1037 in accordance with a CR-motor control signal E1036 from the ASIC E1006, to drive the CR motor E0001. A LF/PG-motor driver E1009 uses the motor power supply E1040 as the driving source, generates a LF-motor driving signal E1035 in accordance with a pulse-motor (PM) control signal E1033 from the ASIC E1006 to drive a LF motor, and also generates a PG-motor driving signal E1034 to drive a PG motor.

A power-supply control circuit E1010 controls supply of electric power to each sensor having a light-emitting device, and the like in accordance with a power-supply control signal E1024 from the ASIC E1006. The parallel I/F E0016 transfers a parallel-I/F signal E1030 from the ASIC E1006 to a parallel I/F cable E1031 connected from the outside, and also transfers a signal from the parallel I/F cable E1031 to the ASIC E1006. The serial I/F E0017 transfers a serial-I/F signal E1028 from the ASIC E1006 to a serial-I/F cable E1029 connected from the outside, and also transfers a signal from the serial-I/F cable E0029 to the ASIC E1006.

On the other hand, a head power supply signal (VH) E1039, a motor-power-supply signal (VM) E1040 and a logic power supply signal (VDD) E1041 are supplied from the power-supply unit E0015. A head power supply ON signal (VHON) and a motor power supply ON signal (VMON) from the ASIC E1006 are input to the power-supply unit E0015, to control ON/OFF of the head power supply E1039 and the motor power supply E1040. The logic power supply (VDD) E1041 supplied from the power-supply unit E0015 is supplied to each unit inside and outside of the main PCB E0014 after being subjected to voltage conversion if necessary.

The head power supply signal E1039 is transmitted to the flexible flat cable E0011 after being smoothed on the main PCB E0014, and is used for driving the recording head cartridge H1000. A reset circuit E1007 detects a decrease in the voltage of the logic power supply signal E1041, and supplies the CPU E1001 and the ASIC E1006 with a reset signal (RESET) E1015 to perform initialization.

The ASIC E1006 is a one chip semiconductor integrated circuit, and is controlled by the CPU E1001 via the control bus E1014. The ASIC E1006 outputs the CR-motor control signal E1036, the PM-signal control signal E1033, the power supply control signal E1024, the head power supply ON signal E1022, the motor power supply ON signal E1023 and the like that have been described above, exchanges signals with the parallel I/F E0016 and the serial I/F E0017, detects the state of each of a PE detection signal (PES) E1025 from the PE sensor E0007, an ASF detection signal (ASFS) E1026 from the ASF sensor E0009, a GAP detection signal (GAPS) E1027 from the GAP sensor E0008 for detecting a gap between the recording head and the recording medium, and a PG detection signal (PGS) E1032 from the PG sensor E0010, and transmits data indicating the state to the CPU E1001 via the control bus E1014. Based on the input data, the CPU E1001 flashes the LED E0020 by controlling driving by an LED driving signal E1038.

The ASIC E1006 also generates a timing signal by detecting the state of an encoder signal (ENC) E1020, and controls a recording operation by interfacing with the recording-head cartridge H1000 using a head control signal E1021. The encoder signal (ENC) E1020 is an output signal from the CR encoder sensor E0004 input via the flexible flat cable E0012. The head control signal E1021 is supplied to the recording head H1000 via the flexible flat cable E0012, the carriage substrate E0013 and the contact FPC E0011.

Figure 9:
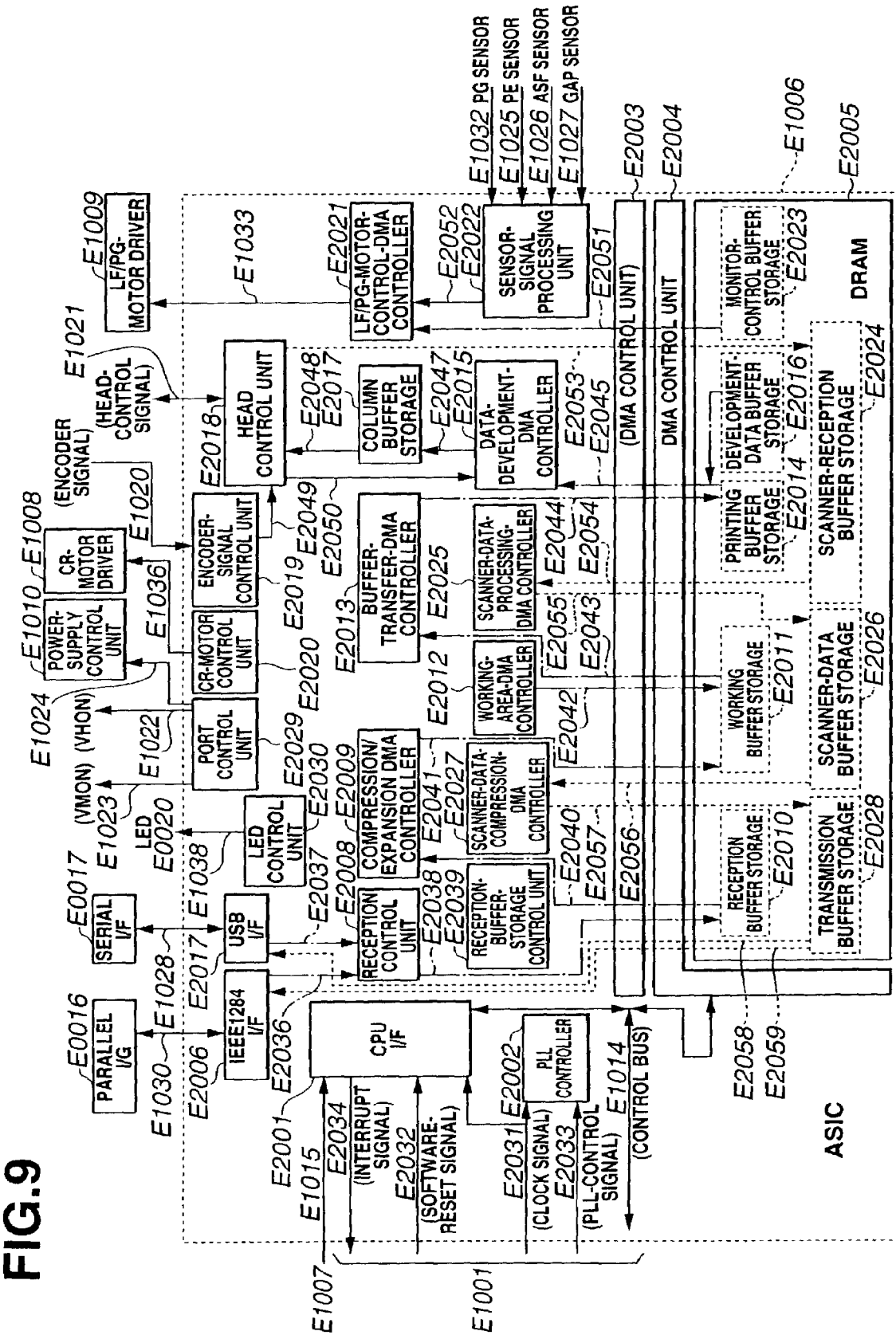
FIG. 9 is a block diagram illustrating the internal configuration of an ASIC (application specific integrated circuit) shown in FIG. 8.

FIG. 9 is a block diagram illustrating the internal configuration of the ASIC E1006.

In FIG. 9, as for connection between respective blocks, only the flow of data relating to control of the head and respective components, such as recording data, motor-control data and the like. In order to prevent complication in the description of FIG. 9, a control signal and a clock signal relating read/write of a register incorporated in each block, a control signal relating to DMA (direct memory access) control, and the like are omitted.

In FIG. 9, A PLL (phase-locked loop) controller E2002 generates a clock signal (not shown) to be supplied to most components within the ASIC E1006, in response to a clock signal (CLK) E2031 and a PLL control signal (PLLON) E2033 output from the CPU E1001.

A CPU interface (I/F) E2001 performs control of register read/write for each block, or the like (to be described later), supply of a clock signal to some blocks, reception of an interrupt signal, or the like (to be described later, not shown in FIG. 9), in accordance with a reset signal E1015, a software reset signal (PDWN) E2032 output from the CPU E1001, a clock signal (CLK) E2031, or a control signal from the control bus E1014, outputs an interrupt signal (INT) E2034 to the CPU E1001, in order to notify generation of interrupt within the ASIC E1006.

A DRAM (dynamic random access memory) E2005 has respective regions for a reception buffer storage E2010, a working buffer storage E2011, a printing buffer storage E2014, a development data buffer storage E2016, and the like, as a data buffer storage for recording, a motor-control buffer storage E2023 for motor control, and a scanner-reception buffer storage E2024, a scanner data buffer storage E2026, and a transmission buffer storage E2028 as buffer storages to be used in a scanner operation mode instead of the above-described buffer storages for recording.

The DRAM E2005 is also used as a working region necessary for the operation of the CPU E1001. That is, a DRAM control unit E2004 performs a reading/writing operation with respect to the DRAM E2005 by switching access from the CPU E1001 to the DRAM E2005 via the control bus E1014, and access from a DMA control unit E2003 (to be described later) to the DRAM E2005.

The DMA control unit E2003 receives a request (not shown) from each block, and performs DRAM access by outputting an address signal and a control signal (not shown), and, in a writing operation, write data E2038, E2041, E2044, E2053, E2055, E2057 or the like, to the DRAM control unit E2004. In a reading operation, read data E2040, E2043, E2045, E2051, E2054, E2056, E2058 or E2059 from the DRAM control unit E2004 to a block, serving as the source of the request.

An IEEE 1284 I/F E2006 operates as a two-way communication interface with an external host apparatus (not shown) via the parallel I/F E0016 by control of the CPU E1001 via the CPU I/F E2001, transmits data (PIF reception data E2036) received from the parallel I/F E0016 to a reception control unit E2008 according to DMA processing, during a recording operation, and transmits data (IEEE 1284 transmission data (RDPIF) E2059) stored in the transmission buffer storage E2028 within the DRAM E2005 to the parallel I/F E0016 according to DMA processing, during a scanner reading operation.

A universal serial bus (USB) I/F E2007 operates as a two-way communication interface with an external host apparatus (not shown) via the serial I/F E0017 by control of the CPU E1001 via the CPU I/F E2001, transmits data (USB reception data E2037) received from the serial I/F E0017 to the reception control unit E2008 according to DMA processing, during a printing operation, and transmits data (USB transmission data (RDUSB) E2058) stored in the transmission buffer storage E2028 within the DRAM E2005 to the serial I/F E0017 according to DMA processing, during a scanner reading operation. The reception control unit E2008 writes received data (WDIF) E2038 from an I/F selected from the 1284 I/FF E2006 and the USB I/F E2007 into a reception buffer write address managed by a reception buffer storage control unit E2039. A compression/expansion DMA controller E2009 reads received data (raster data) stored in the reception buffer E2010 from a reception buffer read address managed by the reception-buffer control unit E2039 by control of the CPU E1001 via the CPU I/F E2001, performs compression/expansion of read data (RDWK) E2040 in accordance with an assigned mode, and writes resultant data in a working buffer region as a recording-code string (WDWK) E2014.

A recording buffer transfer DMA controller E2013 reads recording codes (RDWP) E2043 stored in the working buffer storage E2011 by control of the CPU E1007 via the CPU I/F E2001, and transfers the respective recording codes by rearranging them in addresses in the printing buffer storage E2014 so as to be adapted to the data transfer order to the recording-head cartridge H1000, and transfers resultant data (WDWP E2044). A working area DMA controller E2012 repeatedly writes assigned working-field data (WDWF) E2042 in regions in a working buffer storage where transfer by the recording buffer transfer DMA controller E2013 has been completed by control of the CPU E1001.

A recording data development DMA controller E2015 reads recording codes written in the printing buffer storage by being rearranged and development data written in a development data buffer storage E2016, using a data-development timing signal E2050 from the head control unit E2018 as a trigger, and writes development recording data (RDHDG) E2045 in a column buffer storage E2017 as column buffer storage write data (WDHDG) E2047. The column buffer storage E2017 is a SRAM (static random access memory) for temporarily storing transfer data (development recording data) to the recording head cartridge H1000, and is subjected to shared management by a hand shaking signal (not shown) between a recording data development-DMA controller E2015 and the head control unit E2018.

The head control unit E2018 operates as an interface with the reading head cartridge H1000 or the scanner via a head control signal, by control of the CPU E1001 via the CPU I/F E2001, and outputs a data-development timing signal E2050 to the recording data development DMA controller E2015, based on a head-driving timing signal E2049 from an encoder-signal processing unit E2019.

During a printing operation, development recording data (RDHD) E2048 from the column buffer storage E2017 in accordance with the head-driving timing signal E2049, and the read data is output to the recording head cartridge H1000 as the head control signal E1021. In a scanner reading mode, received data (WDHD) E2053 input as the head control signal E1021 is subjected to DMA transfer to the scanner reception buffer storage E2024 in the DRAM E2005. A scanner data processing DMA controller E2025 reads reception buffer storage reading data (RDAV) E2054 stored in the scanner reception buffer storage E2024, and writes processed data (WDAV) E2055 obtained after performing processing, such as equalization or the like, in the scanner data buffer storage E2026 in the DRAM E2005 by control of the CPU E1001 via the CPU I/F E2001. A scanner data compression DMA controller E2027 performs data compression after reading processed data (RDYC) E2056 stored in the scanner data buffer storage E2026 by control of the CPU E1001 via the CPU I/F E2001, and transfers/writes compressed data (WDYC) E2057 to/in the transfer buffer storage E2028.

The encoder signal processing unit E2019 outputs a head driving timing signal E2049 in accordance with a determined mode by control of the CPU E1001 by receiving the encoder signal (ENC) E1020, stores information relating to the position and the velocity of the carriage M4001 obtained from the encoder signal E1020, and supplies the CPU E1001 with the stored information. The CPU E1001 determines various parameters for controlling the CR motor E0001, based on this information. A CR-motor control unit E2020 output a CR-motor control signal E1036 by control of the CPU E1001 via the CPU I/F E2001.

A sensor-signal processing unit E2022 receives various detection signals E1033, E1025, E1026 and E1027 output from the PG sensor E0010, the PE sensor E0007, the ASF sensor E0009, the GAP sensor E0008 and the like, and transmits such sensor information to the CPU E1001 in accordance with a determined mode determined by control of the CPU E1001, and outputs a sensor detection signal E2052 to a DMA controller E2021 for controlling the LF/PG motor.

The DMA controller E2021 for controlling the LF/PG motor reads a pulse-motor driving table (RDPM) E2051 from the motor-control buffer storage E2023 in the DRAM E2005 and outputs a pulse-motor control signal E1033, using the above-described sensor detection signal E2052 as a trigger for control, depending on an operational mode, by control of the CPU E1001 via the CPU I/F E2001. An LED control unit E2030 outputs an LED driving signal E1038 by control of the CPU E1001 via the CPU I/F E2001. A port control unit E2029 outputs a head power supply ON signal E1022, a motor power supply ON signal E1023, and a power supply control signal E1024, by control of the CPU E1001 via the CPU I/F E2001.

5. Operation of the Printer

Figure 10:
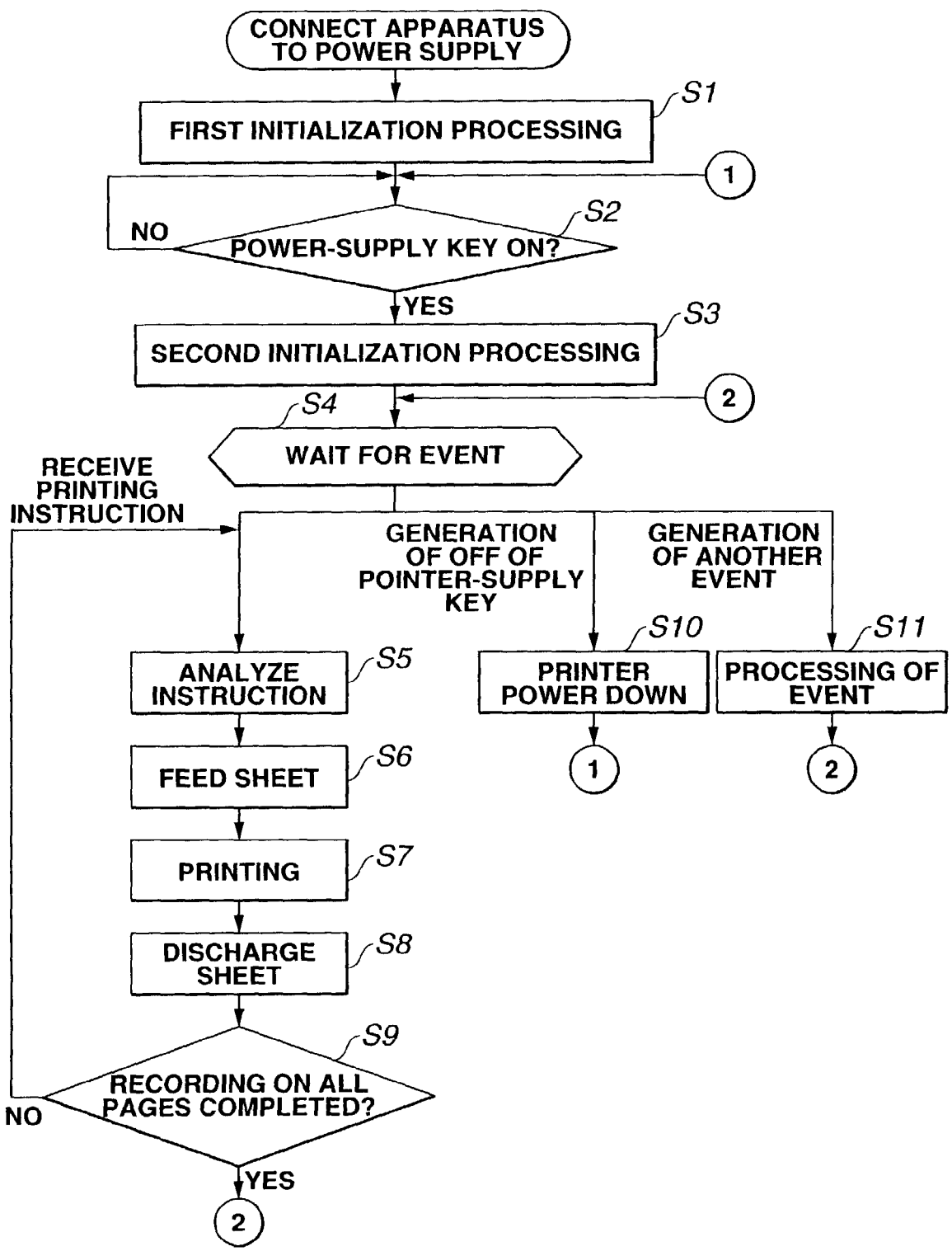
FIG. 10 is flowchart illustrating operations in the first embodiment.

Next, a description will be provided of the operation of the ink-jet recording apparatus of the first embodiment having the above-described configuration, with reference to the flowchart shown in FIG. 10.

Upon connection of the apparatus main body 1000 (shown in FIG. 1) to an AC power supply, first, in step S1, first initialization processing for the apparatus is performed. In this initialization processing, respective components, such as the ROM, the RAM and the like, of the electric circuitry system of the apparatus are checked, in order to confirm that the apparatus is electrically operable normally.

Then, in step S2, it is determined whether or not the power-supply key E0018 (shown in FIG. 1) provided on the upper case M1002 of the apparatus main body M1000 has been switched on. If the result of the determination in step S2 is affirmative, the process proceeds to step S3, where second initialization processing is performed.

In this second initialization processing, respective driving mechanisms and the recording head of the apparatus are checked. That is, whether or not the apparatus can be normally operated is confirmed, at initialization of various motors and reading of head information.

Then, in step S4, the apparatus waits for an event. That is, an instruction event from an external I/F, a panel key event by the user's operation, an internal control event, or the like with respect to the apparatus is monitored. When such an event has been generated, processing corresponding to the event is executed.

For example, when a printing instruction event from the external I/F has been received in step S4, the process proceeds to step S5. When a power supply key event by the user's operation has been generated in step S4, the process proceeds to step S10. When another event has been generated in step S4, the process proceeds to step S11. In step S5, the assigned type of paper, the size of paper, the printing quality, the method of sheet feeding, and the like are determined by analyzing a printing instruction from the external I/F. Data representing the result of the determination is stored in the RAM E2005 within the apparatus, and the process proceeds to step S6. In step S6, sheet feeding is started according to the sheet feeding method assigned in step S5, to feed the sheet to a position to start recording, and the process proceeds to step S7. In step S7, a recording operation is performed. In the recording operation, recording data transmitted from the external I/F is first stored in the recording buffer storage. Then, the movement of the carriage M4001 to the main scanning direction is started by driving the CR motor E0001, and recording of one line is performed by supplying recording data stored in the printing buffer storage E2014 to the recording head H1001. Upon completion of recording of recording data for one line, the sheet is fed to the sub-scanning direction by driving the LF motor E0002 and rotating the LF roller M3001. The above-described operation is repeatedly executed. Upon completion of recording of recording data for one page from the external I/F, the process proceeds to step S8.

In step S8, sheet feeding is repeated until it is determined that the sheet has been completely discharged from the apparatus by driving the LF motor E0002 and the sheet discharge roller M2003. Upon completion of this operation, the sheet is completely discharged on the discharged sheet tray M1004a (shown in FIG. 1).

In step S9, it is determined whether or not a recording operation for all pages to be recorded has been completed. If the result of the determination in step S9 is negative, the process returns to step S5, and the above-described processing of steps S5-S9 is repeated. Upon completion of the recording operation for all pages to be recorded, the recording operation is terminated. The process then returns to step S4, where the next event is awaited.

In step S10, processing of ending the printer is performed, and the operation of the apparatus is stopped. That is, in order to disconnect power supplies for various motors, the head and the like, after shifting to a state in which the power supplies can be disconnected, the power supplies are disconnected, and the process proceeds to step S4, where the next event is awaited.

In step S11, processing of an event other than the above-described ones is performed. For example, processing corresponding to each type of panel key of the apparatus, a recovery instruction from the external I/F, an internally generated recovery event, or the like is performed. Upon completion of the processing, the process returns to step S4, where the next event is awaited.

6. Head Configuration

The configuration and the arrangement of a group of discharging ports of the head H1001 (shown in FIG. 3) used in the first embodiment will now be described.

Figure 11:
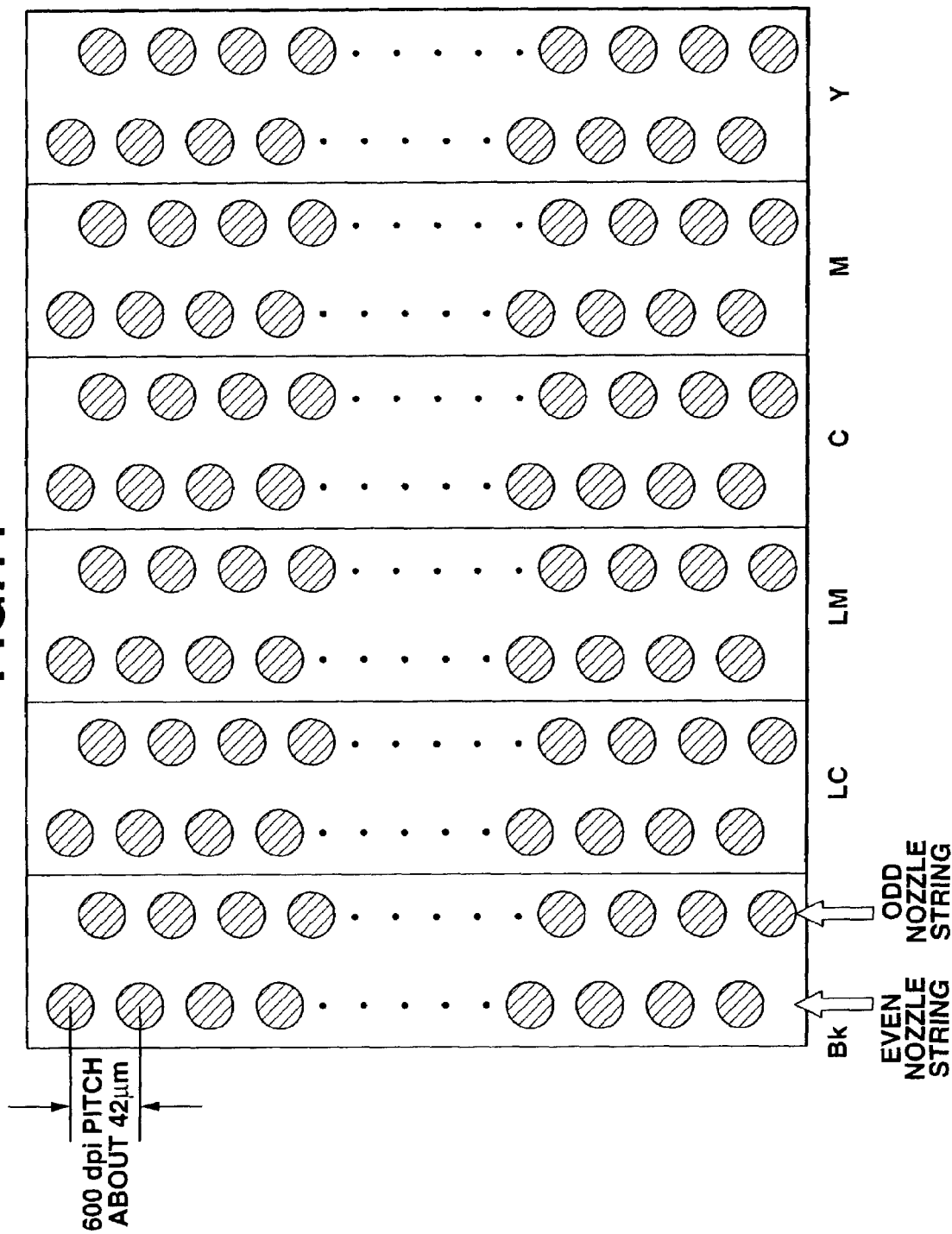
FIG. 11 is a diagram illustrating arrangement of nozzles of the recording head in the first embodiment.

FIG. 11 is a schematic front view of a head for realizing high-density recording, used in the first embodiment. In this case, two discharging-port strings, in each of which 128 discharging ports are arranged with a pitch of 600 dpi (dots per inch) per column (a pitch of about 42 µm), are provided per color in the main scanning direction (the scanning direction by the cartridge) by being shifted by about 21 µm in the sub-scanning direction (sheet feeding direction), to realize an output resolution of 1,200 dpi (a pitch of about 21 µm) with 256 discharging ports in total per color. In the case of FIG. 11, such discharging-port strings are arranged in parallel in the main scanning direction so as to correspond to six colors, to provide an integrated-structure head that performs recording with 1,200 dpi in the sub-scanning direction with 12 discharging-port strings in total for six colors. Parallel discharging-port strings for two colors are simultaneously manufactured in the form of one chip, and three chips are bonded in parallel. Accordingly, adjacent nozzle strings for two colors on each chip (a pair of black (Bk) and light cyan (LC), a pair of light magenta (LM) and cyan (C), and a pair of magenta (M) and yellow (Y)) have similar driving conditions compared with other pairs of nozzle strings.

When causing the head having a resolution of 1,200 dpi in the sub-scanning direction shown in FIG. 11 to perform scanning with a resolution of 2,400 dpi in the main scanning direction, one recording pixel on paper has a size of about 10.6 µm×about 21.2 µm in the main scanning direction. One drop used in the first embodiment has a volume of about 4 pl, and forms a circular dot having a diameter of about 45 µm on paper. At that time, the area of one dot is about 1,570 µm$^2$, which is much larger than the region of one recording pixel of about 10.6 µm×about 21.2 µm=225 µm$^2$.

7. First Example of Index Processing

When performing index processing, if the number of gradation levels is the same for all color tones to be used, the required capacity of the memory increases as described above. In the recent situation in which high-density mounting of a large number of nozzles is in progress in order to provide high picture quality, and a large print head tends to be used in order to increase the printing speed, the amount of data dealt with in a printing apparatus is becoming very large. In such a situation, even if the amount of input data can be reduced than in binary processing, it is desirable to appropriately suppress the amount of handled data even when performing index processing, and minimize a decrease in the data processing speed.

In the first embodiment, as described above, in a configuration in which printing with high picture quality can be performed using photo-ink materials (light cyan and light magenta) in addition to ink materials of ordinary colors (black, cyan, magenta and yellow), by providing an index pattern having an appropriate number of gradation levels for each color tone (i.e., a color and a density) of each ink, it is intended to reduce the amount of data, realize high-speed data processing, optimize color processing and the number of reproduced gradation levels, and allow to provide a print with high picture quality that does not have graininess.

More specifically, for an input resolution of 600 ppi, a five-value index pattern is provided for ink of an ordinary color (hereinafter termed "deep-color ink") including colors having high optical densities (OD (optical density) values), and a nine-value index pattern is provided for photo ink having low optical densities (hereinafter termed "light color ink"). Halftone is generated according to an error diffusion method.

As for graininess in the entire density region, graininess is less pronounced in a highlight region of an image because photo ink having a low density (for example, ⅙ of the density of deep-color ink) can be used. In a region having at least a medium density, deep color ink is also used, and in a region having a high density, deep color ink is mainly used. Particularly, at a point where it is started to also use deep color ink in the medium density region, i.e., a point where dots formed by deep color ink start to be mixed with dots formed by light color ink, dots with deep color ink are pronouncedly observed, thereby reinforcing graininess. A medium density region is used for reproducing a flesh color, a blue sky or the like that is keenly sensed by human vision, it is desirable to minimize graininess.

A description will now be provided of the relationship between the amount of ink provided into a print medium in order to form a dot and the recording density. The amount of ink provision is an index indicating how many dots (number) to cover a unit region corresponding, for example, to a recording resolution of 1,200 dpi×1,200 dpi are provided in the unit region. The amount of ink provision when one dot is provided per unit area equals 100%. Accordingly, the amount of ink provision when two dots are provided per unit region equals 200%, and the amount of ink provision when three dots are provided per unit area equals 300%.

Figure 12:
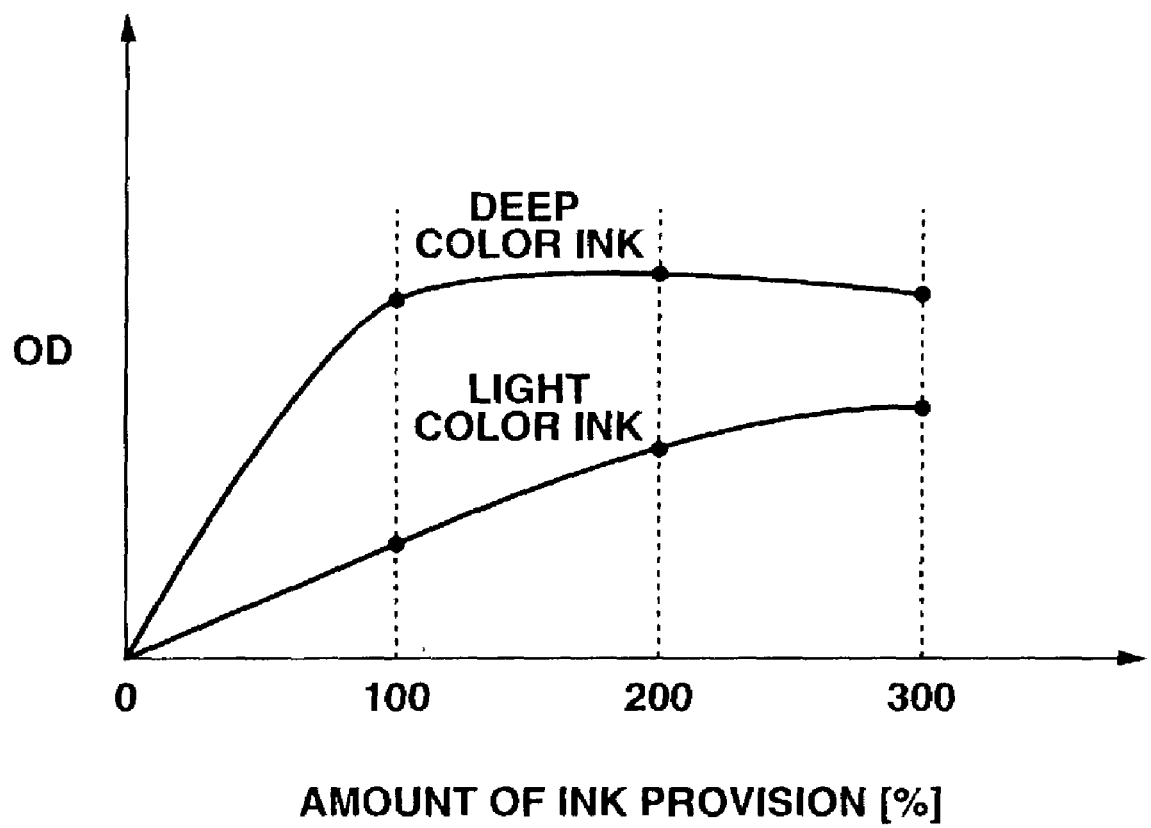
FIG. 12 is a graph illustrating changes in the density (OD (optical density) value) with respect to the amount of ink provision, for deep ink and light ink.

As shown in FIG. 12, in the case of deep color ink, the density linearly increases in a range in which the amount of ink provision is 0-100%. However, the density hardly increases when the amount of ink provision exceeds 125%. When the amount of ink provision exceeds 200%, the density decreases, or degradation in the picture quality due to overflow of ink occurs. Accordingly, as for deep color ink, gradation due to a linear increase of the density is obtained within a range in which the amount of ink provision is 0-100%. On the other hand, in the case of light color ink, the density linearly increases within a range in which the amount of ink provision is 0-200%. When the amount of ink provision is further increased to 300%, the density hardly increases, and ink sometimes overflows from the print medium to cause degradation in the picture quality. Accordingly, as for light color ink, when the amount of ink provision is set within a range of 0-300%, excellent gradation due to a linear increase of the density is obtained than when the amount of ink provision is set to a range with an upper limit of 100%.

In the first embodiment, by reducing the difference in the density between light color ink and deep color ink by setting, for example, the maximum amount of provision of light color ink to about 175%, dots by deep-color ink become less pronounced, and graininess in a medium density region is reduced.

Figure 13A:
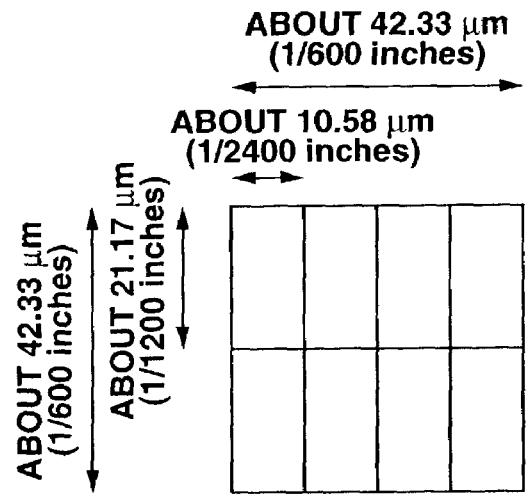
FIGS. 13A-13C are diagrams illustrating dot arrangements for basic patterns for index processing for deep color ink and light color ink, in the first embodiment.
Figure 13B:
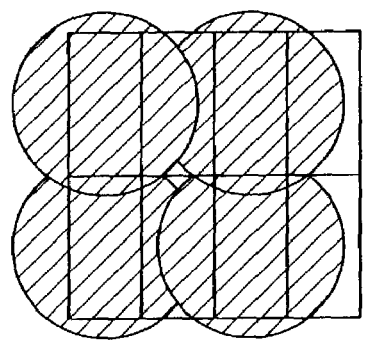
Figure 13C:
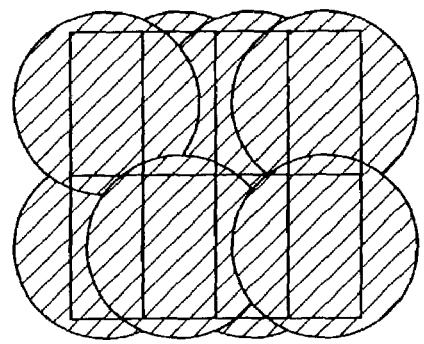

As shown in FIG. 13A, a case in which gradation representation is provided by performing such processing with a dot arrangement comprising eight recording pixels (four pixels in the main scanning direction×two pixels in the sub-scanning direction, with a size of one recording pixel of about 10.58 μm (½,₄₀₀ inch) in the main scanning direction and about 21.17 μm (¹⁄₁,₂₀₀ inch) in the sub-scanning direction) will now be considered. In the print head of the first embodiment, as described above, a circular dot having a diameter of about 45 μm is formed on paper. Accordingly, as shown in FIG. 13B, if four dots are arranged from among eight recording pixels (i.e., four dots are arranged in four unit regions), the amount of ink provision is substantially 100%. As shown in FIG. 13C, if dots are arranged for all of eight recording pixels (i.e., eight dots are arranged in four unit regions), the amount of ink provision is substantially 200%.

As described above, in the case of deep color ink, the density hardly increases even if the amount of ink provision is set to at least 100%. If the ink is provided to an amount more than necessary, for example, blotting of ink occurs, causing a decrease in the image quality. Accordingly, in the first embodiment, five-value index processing (level 0-level 4 shown in FIG. 14A), in which 0-4 dots are arranged for eight recording pixels and the maximum amount of ink provision is set to 100%, is performed. On the other hand, in the case of light-color ink, since the density linearly increases until the amount of ink provision exceeds about 200%, nine-value index processing (level 0-level 8 shown in FIG. 14B), in which 0-8 dots are arranged for eight recording pixels and the maximum amount of ink provision is set to 200%, is performed.

By thus setting the number of gradation levels of the index pattern for light-color ink to nine, it is intended to improve graininess, and the number of reproduced gradation levels in a highlight region is increased. By setting the number of gradation levels of the index pattern for deep-color ink to five, blotting, overflow and the like of ink are prevented while guaranteeing the maximum density, and degradation in the image quality is suppressed. Thus, it is possible to increase the data processing speed due to reduction in the amount of data processing, and reduce the cost of the apparatus by reducing the memory capacity.

The output resolution in the main scanning direction when performing nine-value index processing is substantially 2,400 dpi, and the output resolution in the main scanning direction when performing five-value index processing is substantially 1,200 dpi. When the resolution in image formation using dot patterns for performing multivalue processing having a relatively large number of gradation levels is represented by X, and the resolution in image formation using dot patterns for performing multivalue processing having a relatively small number of gradation levels is represented by Y, the following equation generically holds:

$1/Y = N/X$ ($N$ is an integer).

8. Second Example of Index Processing

In the above-described first example, it is assumed that the head having a resolution of 1,200 dpi in the sub-scanning direction, shown in FIG. 11, performs scanning with a resolution of 2,400 dpi in the main scanning direction, one recording pixel on paper has a region of about 10.58 μm×about 21.17 μm in the main scanning direction, a nozzle of each color equally discharges ink of about 4 pl per drop, and a circular dot having a diameter of about 45 μm is formed on paper. However, the present invention may, of course, be applied not only to the print head shown in FIG. 11, but also to a case in which printing is performed using a print head having any other appropriate configuration and specifications.

As a second example of index processing, a description will be provided of a case of using a print head corresponding to respective color tones, for example, black (Bk), cyan (C), magenta (M), yellow (Y), light cyan (LC), and light magenta (LM), having nozzles for forming dots having a diameter of about 45 μm (an amount of discharge of about 4 pl per drop) on paper for black, yellow, light cyan and light magenta, and nozzles for forming dots having a diameter of about 30 μm (an amount of discharge of about 2 pl per drop, and a ratio of blotting of about 2.0) on paper for cyan and magenta. The number of nozzles and the recording resolution of the print head for each color tone are the same as in the first example.

In the second example, for an input resolution of 600 dpi, a nine-value index pattern is provided for color dots having a diameter of 30 μm (an amount of discharge of about 2 pl), and a five-value index pattern is provided for color dots having a diameter of 45 μm (an amount of discharge of about 4 pl). Halftone is generated according to an error diffusion method.

As described above, as for graininess in the entire density region, graininess is less pronounced in a highlight region of an image because photo-ink having a low density (for example, ⅙ of the density of deep color ink) can be used in the first embodiment. In a region having at least a medium density, deep color ink is also used, and in a region having a high density, deep color ink is mainly used. Particularly, at a point where it is started to also use deep color ink in the medium-density region, i.e., a point where dots formed by deep color ink start to be mixed with dots formed by light-color ink, dots with deep color ink are pronouncedly observed, thereby reinforcing graininess. A medium density region is used for reproducing a flesh color, a blue sky or the like that is keenly sensed by human vision, it is desirable to minimize graininess.

A case in which printing is performed with a resolution of 1,200 dpi in the main scanning direction using a head having a resolution of 1,200 dpi in the sub-scanning direction will now be considered, as a second embodiment of the present invention. In the second embodiment, as shown in FIG. 15A, the size of one recording element is about 21.17 μm in the vertical and horizontal directions with a diagonal distance of about 30 µm. Accordingly, when performing five-value index processing for input data having a resolution of 600 dpi, if the dot diameter on paper is 45 µm (an amount of discharge of 4 pl), then, as shown in FIG. 15B, a sufficient area factor (a fill factor for a recording pixel) can be secured.

When the dot diameter is 30 µm, since the diagonal distance of the recording pixel is 30 µm, a sufficient area factor cannot be secured compared with the case of a dot diameter of 45 µm, as shown in FIG. 15C. As a result, there are the possibilities that a desired maximum density cannot be secured, and unevenness in the density or stripes or the like due to a deviation in the position of ink provision, and the like caused by main-body noise and head noise occur, causing degradation in the image quality.

In the second embodiment, while printing of dots having a resolution of 2,400 dpi in the main scanning direction, i.e., having a size of one recording pixel of about 21.17 µm×about 10.58 µm in the vertical and horizontal directions, respectively, as shown in FIG. 15D, is performed using a head having a resolution of 1,200 dpi in the sub-scanning direction, nine-value index processing (see FIG. 14B) is performed for input data having a resolution of 600 dpi for dots having a diameter of 30 µm (an amount of discharge of 2 pl) on paper, in order to secure a sufficient area factor (see FIG. 15E). It is thereby possible to improve graininess and the number of reproduced gradation levels in a highlight region. For dots having a diameter of 45 µm (an amount of discharge of 4 pl) on paper, by performing five-value index processing (see FIG. 14A) for input data having a resolution of 600 dpi, blotting, overflow and the like of ink are prevented and a decrease in the image quality is suppressed while guaranteeing the maximum density. It is thereby possible to increase the data processing speed due to reduction in the amount of data processing, and reduce the cost of the apparatus due to reduction in the memory capacity.

9. Control System for Index Processing

Figure 16:
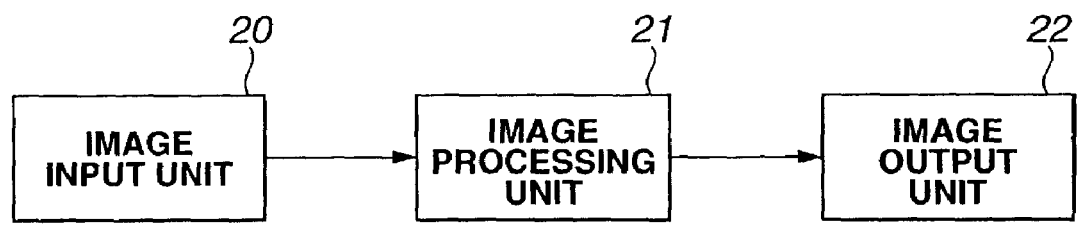
FIG. 16 is a schematic block diagram illustrating an image processing system of an ink-jet printer according to the second embodiment.

FIG. 16 is a schematic block diagram illustrating an image processing system of an ink-jet printer according to the second embodiment. As shown in FIG. 16, the image processing system mainly includes an image input unit 20, an image processing unit 21 and an image output unit 22. The image input unit 20 quantizes image data input from an image input apparatus, such as a digital camera, a scanner or the like, each type of recording medium, or via a communication network, and supplies the image processing unit 21 resultant multivalue data. The image processing unit 21 performs actual image processing, and converts the multi-value data input from the image input unit 20 into data having gradation levels that can be reproduced by the image output unit 22, serving as an ink-jet printing unit. The image output unit 22 performs printing based on data subjected to image processing by the image processing unit 21.

The respective units shown in FIG. 16 are functionally represented. More specifically, these units may be provided as a part of the configuration of the electric circuitry shown in FIGS. 7-9.

Figure 17:
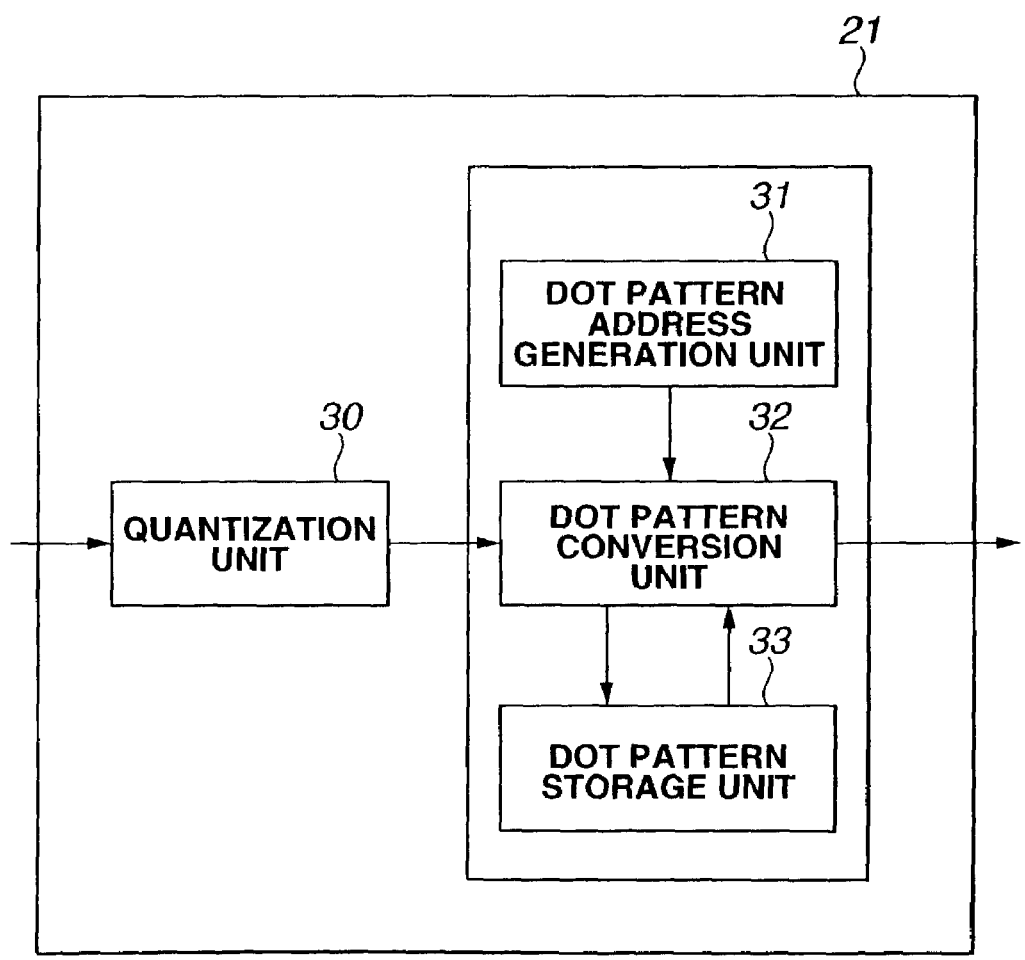
FIG. 17 is a block diagram illustrating a more detailed configuration of an image processing unit shown in FIG. 16.

FIG. 17 is a block diagram illustrating the more detailed configuration of the image processing unit 21 shown in FIG. 16. As shown in FIG. 17, the image processing unit 21 includes a quantization unit 30, a dot-pattern-address generation unit 31, a dot pattern conversion unit 32 and a dot-pattern storage unit 33. The quantization unit 30 quantizes the multivalue input image data input from the image input unit 20 into N-value gradation data after correcting the data. In the second embodiment, five-value quantization is performed using a submatrix comprising 2×2 dots.

The dot pattern address generation unit 31 generates address information indicating to which position the dot pattern of the current pixel corresponds, for a dot pattern table having a size of M×N dots, and outputs the address information to the dot pattern table conversion unit 32. This address information is determined by pixel position information relating to an input pixel, the size of the entire dot pattern table, and the size of the dot pattern to be output.

The dot pattern conversion unit 32 selects and acquires a dot pattern from the dot pattern table storage unit 33 storing a plurality of dot-pattern tables for index processing, based on the value quantized by the quantization unit 30, and assigns a dot address corresponding to the dot-pattern table.

The dot pattern storage unit 33 holds dot pattern tables corresponding to values quantized by the quantization unit 30, selects a dot pattern from the plurality of dot pattern tables, and outputs the selected dot pattern to the dot pattern table conversion unit 31.

The dot pattern address generation unit 31 will now be described with reference to FIG. 18.

The dot pattern address generation unit 31 performs setting so as to be able to assign addresses in the assigned table for respective color tones, i.e., black (Bk), cyan (C), magenta (M), yellow (Y), light cyan (LC) and light magenta (LM), by performing sequential switching using a switch or the like, and transfers address data to the dot-pattern-table conversion unit 32.

Figure 19:
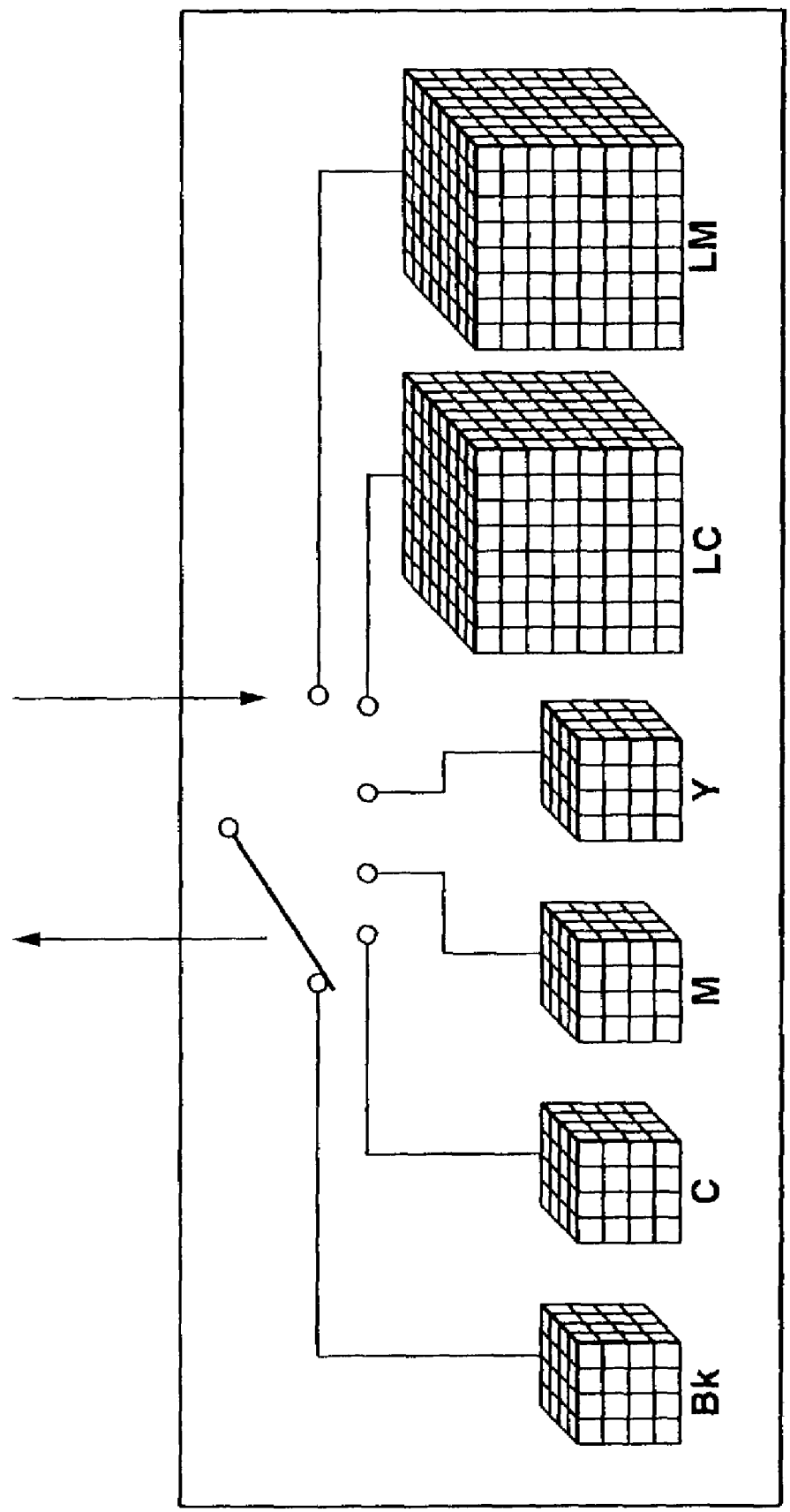
FIG. 19 is a block diagram illustrating a more detailed configuration of a dot pattern table storage unit shown in FIG. 17.

FIG. 19 is a diagram illustrating a configuration of the dot pattern table storage unit 33 for respective color tones. A pattern table for index processing is stored for each of the color tones, i.e., black (B), cyan (C), magenta (M), yellow (Y), light cyan (LC) and light magenta (LM).

10. Printing Control

Figure 14B:
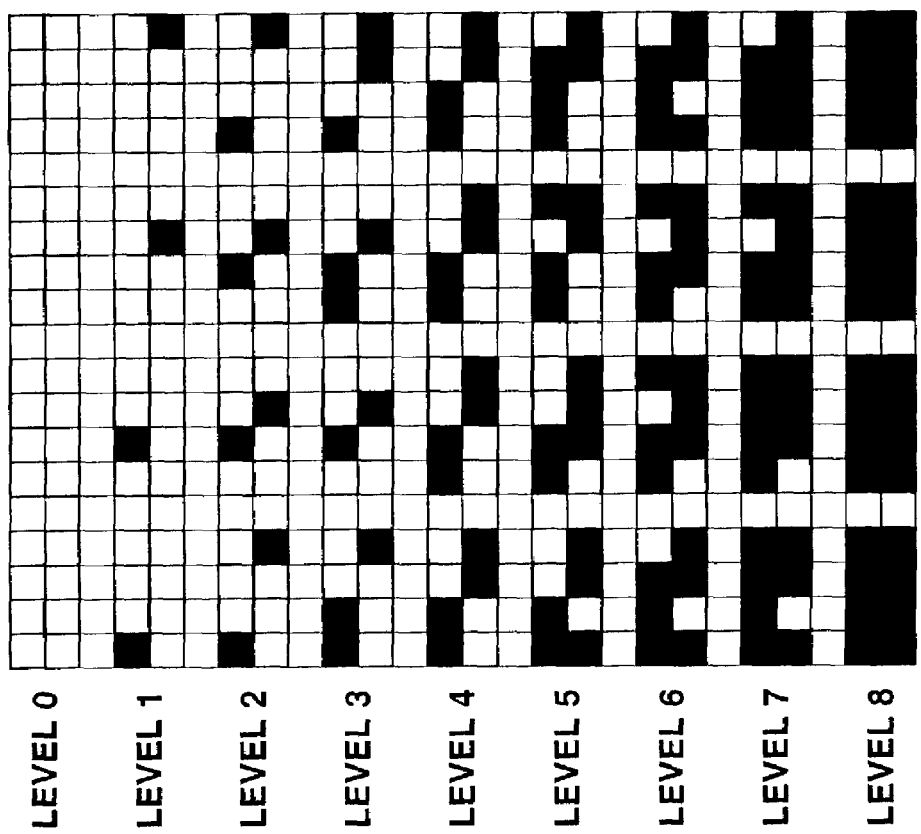
FIGS. 14A and 14B are diagrams illustrating index processing in the first embodiment.
Figure 14A:
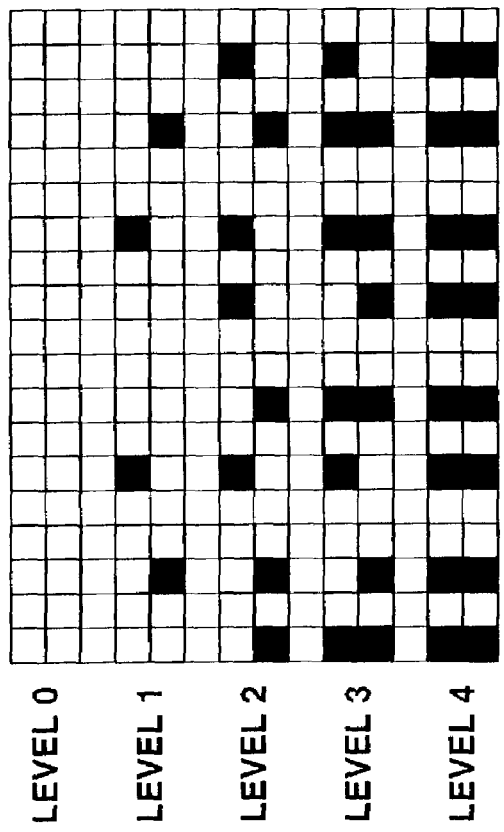

For example, in a first example of index processing, a print head having nozzles having a dot diameter of 45 µm (an amount of discharge of 4 pl) is used for all color tones, with a recording resolution of 1,200×2,400 dpi, and patterns for five-value index processing in which the maximum amount of ink provision is 100% for Y, M, C and B are provided, and patterns for nine-value index processing in which the maximum amount of ink provision is 200% for LM and LC are provided. When using indices as shown in FIGS. 14A and 14B, printing for the same image region may be performed by adopting printing control in a single scanning operation, or by adopting printing control in a plurality of scanning operations, provided that a predetermined amount of ink provision is secured when printing scanning for the same image region is completed. In the latter approach, skipping processing for forming complementary dots is performed at each main scanning operation.

The present invention is not limited to the above-described example. For example, when performing image formation using a print head for discharging ink in a plurality of different conditions, such as the color tone (the color and density) to be used, the dot diameter (the amount of discharge), the maximum amount of ink provision, and the like, appropriate printing control can be performed by appropriately setting dot patterns for index processing, the recording resolution, the amount of ink provision and the like in accordance with the plurality of conditions. It is thereby possible to increase the data processing speed due to reduction in the amount of data processing, and reduce the cost of the apparatus due to reduction in the memory capacity.

In a third embodiment of the present invention to be described below, a description will be provided of a case in which, as in the above-described cases, the maximum amount of ink provision is set to 100% and 200% for Y, M, C and B, and for LM and LC, respectively, the recording resolution is set to 1,200×1,200 dpi and 1,200×2,400 dpi for the former colors and for the latter colors, respectively, and by adopting multiscanning and using appropriately skipped patterns (masks), printing, in which the maximum amount of ink provision is set to 100% and 200% for the former colors and for the latter colors, respectively, when terminating multiscanning, is performed.

Figure 20:
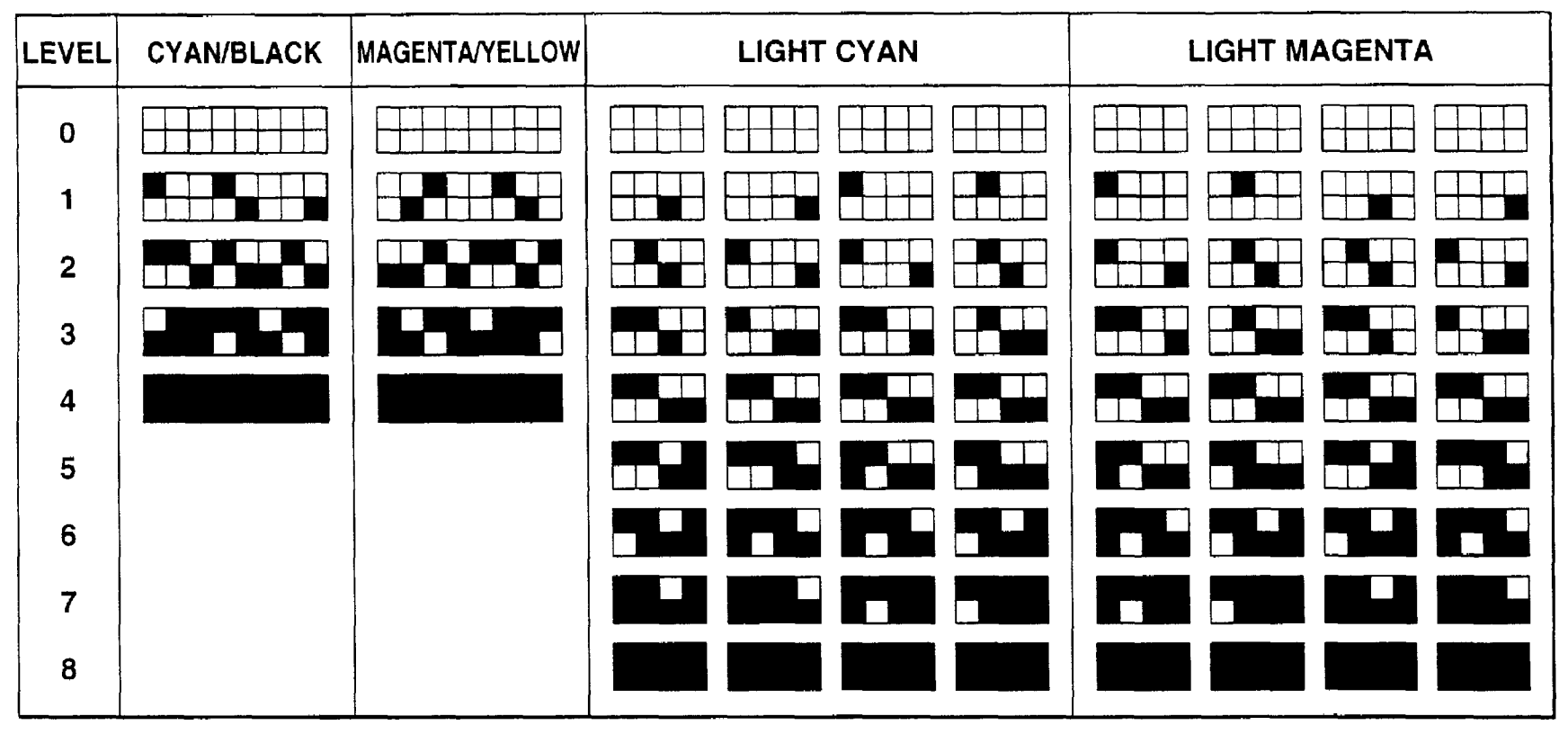

FIG. 20 illustrates a dot pattern table used in the third embodiment. In the third embodiment, five-value patterns for index processing are provided for black (B), cyan (C), magenta (M) and yellow (Y), and nine-value patterns for index processing are provided for light magenta (LM) and light cyan (LC). The basic pattern for B, C, M and Y comprises 2×2 dots per input pixel, and the basic pattern for LM and LC comprises 4×2 dots per input pixel. When all dots are arranged within the basic pattern, the maximum amount of ink provision equals 100%.

For cyan and black, the basic pattern comprising 2×2 dots per input pixel is developed, and output levels are represented by five steps (0-4) for input levels. For the adjacent input pixel, the basic pattern comprising 2×2 dots per input pixel is also developed, and output levels are represented by five steps (0-4) for input levels. For subsequent adjacent input pixels, similar development is performed. For pixels after the fifth input pixel, the pattern of development for the first input pixel is repeated. As for magenta and yellow, a pattern having 2×2 dots is determined according to the same approach for cyan and black, although the arrangement of dot patterns differs.

For light cyan, the basic pattern comprising 2×4 dots per input pixel is developed, and output levels are represented by nine steps (0-8) for input levels. For the adjacent input pixel, the basic pattern comprising 2×4 dots per input pixel is also developed, and output levels are represented by nine steps (0-8) for input levels. For subsequent adjacent input pixel, similar development is performed. For pixels after the fifth input pixel, the pattern of development for the first input pixel is repeated. As for light magenta, a pattern having 2×4 dots is developed in the same manner. As described above, for photo-ink materials (light cyan and light magenta), data development is performed with a size larger than the size for ordinary ink materials (black, cyan, magenta and yellow).

Figure 21A:
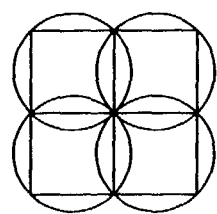
Figure 21B:
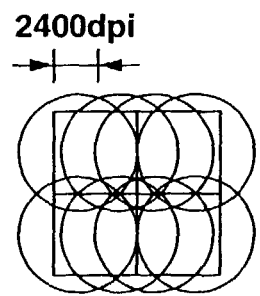

FIGS. 21A and 21B are schematic diagrams, each illustrating dot formation in the third embodiment. As shown in FIG. 21A, in the case of ordinary ink materials (black, cyan, magenta and yellow), each dot is arranged on a grid having a resolution of 1,200 dpi. As shown in FIG. 21B, in the case of photo-ink materials (light cyan and light magenta), each dot is arranged with a resolution of 2,400 dpi in the raster direction (sub-scanning direction), because of the following reason. That is, in the case of photo-ink materials (LC and LM), the relationship between the density and the amount of ink provision is linear, and as described with reference to FIG. 12, the effect of increasing the density is confirmed until the amount of ink provision exceeds 200%. On the other hand, in the case of ordinary ink materials (B, C, M and Y), since the relationship between the density and the amount of ink provision tends to be saturated when the amount of ink provision exceeds 100%, the resolution in the raster direction is set to ½ of the resolution for photo-ink materials.

The storage capacity of a memory required for storing tables as in the third embodiment will now be compared with the capacity when using dot patterns for index processing having the same value for all color tones. In the latter case, i.e., for example, when a dot-pattern table having nine values for six colors is used, the necessary storage capacity is:

(2 dots×32 dots×8 patterns×6 colors)/8 bits=384 bytes.

On the other hand, in the case of the third embodiment, the necessary storage capacity is:

{(2 dots×32 dots×8 patterns×2 colors)+(2 dots×16 dots×4 patterns×4 colors)/8 bits=192 bytes.

Accordingly, it is possible to suppress the storage capacity to about 50%, realize reduction in the cost of the apparatus main body, and form an image whose quality is not degraded.

Next, specific printing control will be described. It is assumed that the input resolution is equally 600 dpi for all color tones, and data development for each color tone is performed using dot patterns shown in FIG. 20.

For ordinary ink materials (black, cyan, magenta and yellow), as shown in FIG. 21A, the recording solution is 1,200 dpi both in the raster direction (the main-scanning direction) and the column direction (the sub-scanning direction). For photo ink materials (light cyan and light magenta), as shown in FIG. 21B, the recording solution is 2,400 dpi in the raster direction and 1,200 dpi in the column direction. That is, the output resolution recorded in one scanning operation differs depending on the color tone. In order to increase the output resolution in the main scanning direction for a photo ink material as described above, a technique of skipping some of columns described, for example, in Japanese Patent Application Laid-Open (Kokai) No. 2002-29079 filed by the assignee of the present application may be utilized.

A column skipping recording method described in the above-described patent application will now be briefly described. An image subjected to partial skipping is recorded using a print head by moving a carriage in the main scanning direction at twice an ordinary moving speed. Then, after conveying the print medium in the sub-scanning direction by a predetermined amount, an image portion that has not been recorded by the preceding recording operation is recorded by the print head by moving the carriage in the main scanning direction. That is, an image to be recorded is divided into a plurality of complementary portions, that are sequentially recorded by a plurality of scanning operations. The above-described patent application also describes that, by making the interval between recording positions of pixel portions in the main scanning direction shorter than the distance between basic grid points (for example, 1,200 dpi) without changing the moving speed of the carriage at every main scanning operation (pass) of a print head, the recording resolution in the main scanning direction is improved, and that this approach is adopted together with the above-described approach.

In the third embodiment, by performing the above-described column skipping, a resolution of 1,200 dpi and a resolution of 2,400 dpi are realized for ordinary color tones and photo-ink color tones, respectively. Dot patterns and mask patterns in eight-pass printing will now be described. In the eight-pass printing, an image region is completed by eight main scanning operations. The eight-pass printing may be realized according to so-called two-way printing in which printing is performed in each of a forward-direction main scanning operation and a backward-direction main scanning operation, i.e., by performing four two-way printing operations.

When dots are arranged as shown in FIG. 21, a dot pattern for ordinary-color (B, C, M and Y) ink has, as shown in FIG. 20, a minimum unit comprising 2×2 dots, and mask patterns for skipping processing may comprise patterns complemented by eight scanning operations. In this case, skipping is appropriately performed so as to realize a resolution of 1,200 dpi even of column skipping is performed.

A dot pattern for photo-ink has a minimum unit comprising 2×4 dots (4×2: the main-scanning direction XX the sub-scanning direction Y), and mask patterns for performing skipping processing comprise patterns complemented by four scanning operations with a resolution of 1,200 dpi. This is because skipping processing in units of a column is performed for a mask pattern for photo-ink, and 200% complementary processing is performed by eight scanning operations in which the pattern is used twice.

Figure 18:
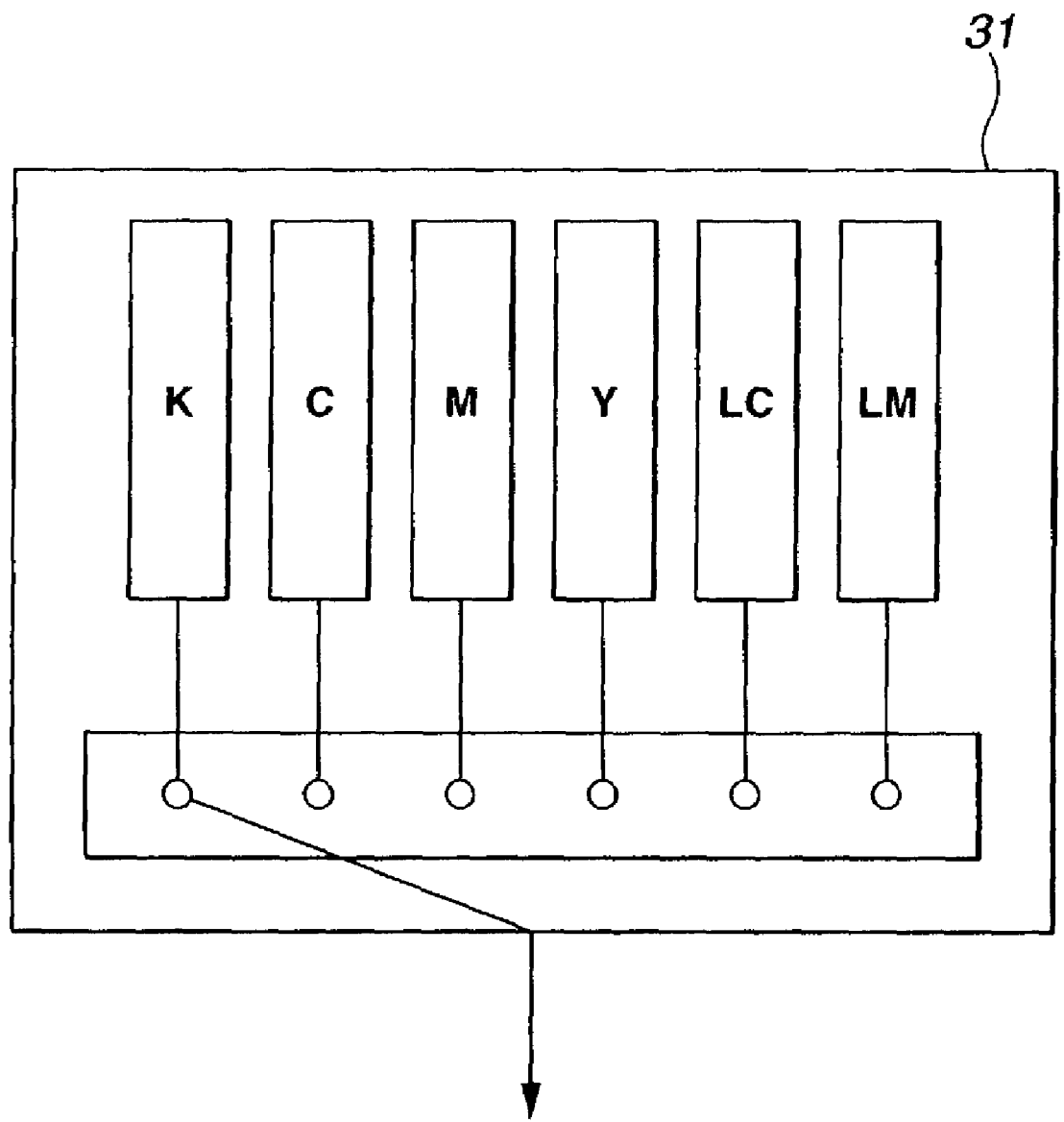
FIG. 18 is a block diagram illustrating a more detailed configuration of a dot pattern address generation unit shown in FIG. 17.

In order to use the above-described mask patterns, a block similar to the block including the dot-pattern-address generation unit 31 and the like shown in FIG. 18 may be provided at the stage succeeding the configuration of FIG. 18. That is, the mask stored in the mask-pattern-table storage unit may be used by performing appropriate switching using a switch or the like for data of each of the color tones, i.e., black (B), cyan (C), magenta (M), yellow (Y), light cyan (LC) and light magenta (LM), subjected to index processing, by a mask-pattern-address generation unit similar to the dot-pattern-address generation unit 31.

Figure 22:
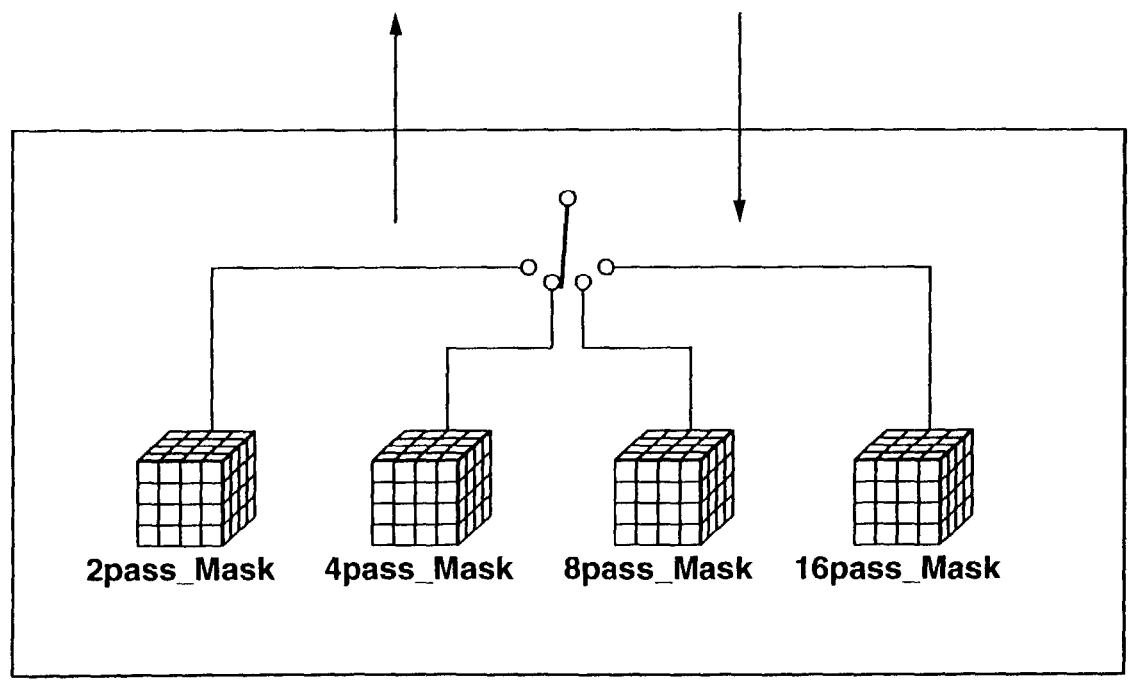
FIG. 22 is a block diagram illustrating a configuration of a mask-pattern-table storage unit used in an image processing system in the third embodiment.

FIG. 22 is a diagram illustrating a configuration of the mask-pattern-table storage unit, that stores a mask pattern for respective passes (2, 4 or 8 passes). In the foregoing description, a mask for 4 passes or 8 passes is utilized. However, a configuration in which various multipass printing operations are allowed corresponding to desired image quality or the like is sometimes adopted. The mask-pattern-table storage unit shown in FIG. 22 can deal with such a case, in which the necessary storage capacity is not increased.

Figure 23A:
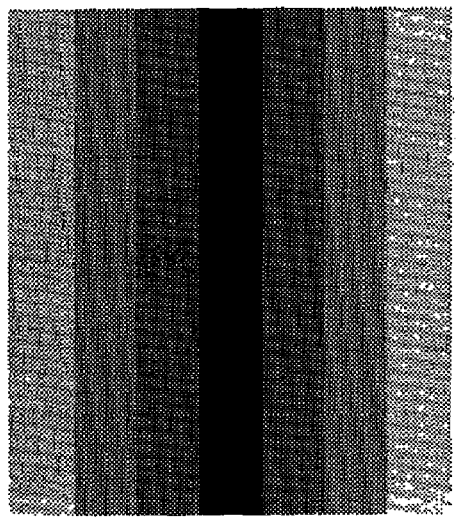
FIGS. 23A and 23B are diagrams illustrating the details of mask patterns used in the third embodiment.
Figure 23B:
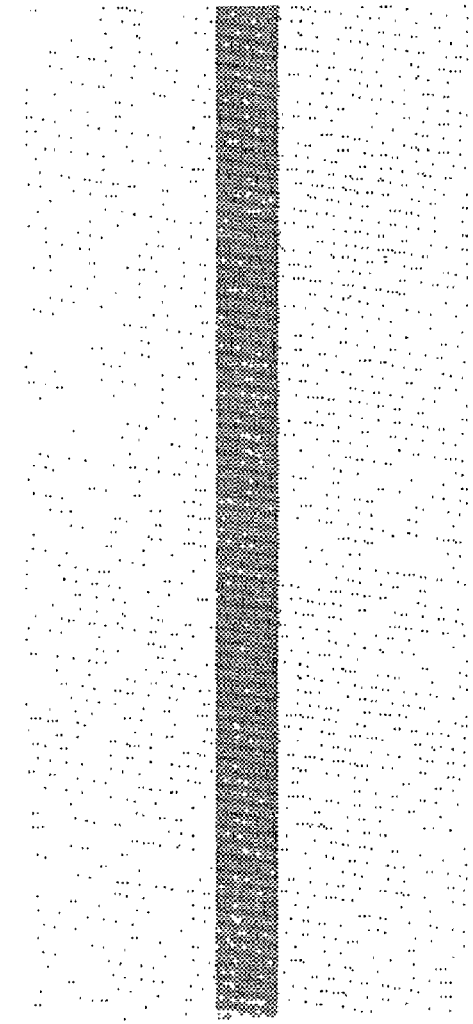

FIGS. 23A and 23B illustrate a mask pattern for 8 passes and a mask pattern for a 4 passes, respectively, that can be used in the third embodiment. In these patterns, the ratio of skipping corresponding to a nozzle near an end portion of the print head is large, because of the following reason. That is, in a print head in which nozzles for discharging fine liquid droplets are mounted with a high density as in the third embodiment, the phenomenon that the position of provision of ink discharged from nozzles at both ends of the head deviates (deviation at end portions) sometimes occurs. Excellent image formation can be performed in such a case by using the mask patterns shown in FIGS. 23A and 23B. This technique is described in Japanese Application No. 2000-216687 (2000) filed by the assignee of the present invention.

As described above, in the third embodiment, by using different dot patterns and mask patterns for index processing for photo-ink and ordinary-color ink, high picture quality can be maintained with a smaller amount of data, compared with a case of using dot patterns having a minimum unit comprising 2×4 dots for all colors.

In the third embodiment, the case of using dot patterns for index processing suitable when using a glossy paper-type printing medium (see FIG. 20) in order to increase the density of photo-ink. By making the basic pattern of a dot pattern matrix for photo ink 2×4 dots, and making the basic pattern of a dot pattern matrix for ordinary color ink 2×4 dots, the memory capacity can be reduced.

However, in an ordinary paper-type print medium, since the ratio of blotting of dye ink is large, it is sometimes advantageous to use a dot-pattern matrix comprising 2×4 dots only for B (black) from among ordinary-color ink materials (B, C, M and Y).

Figure 24:
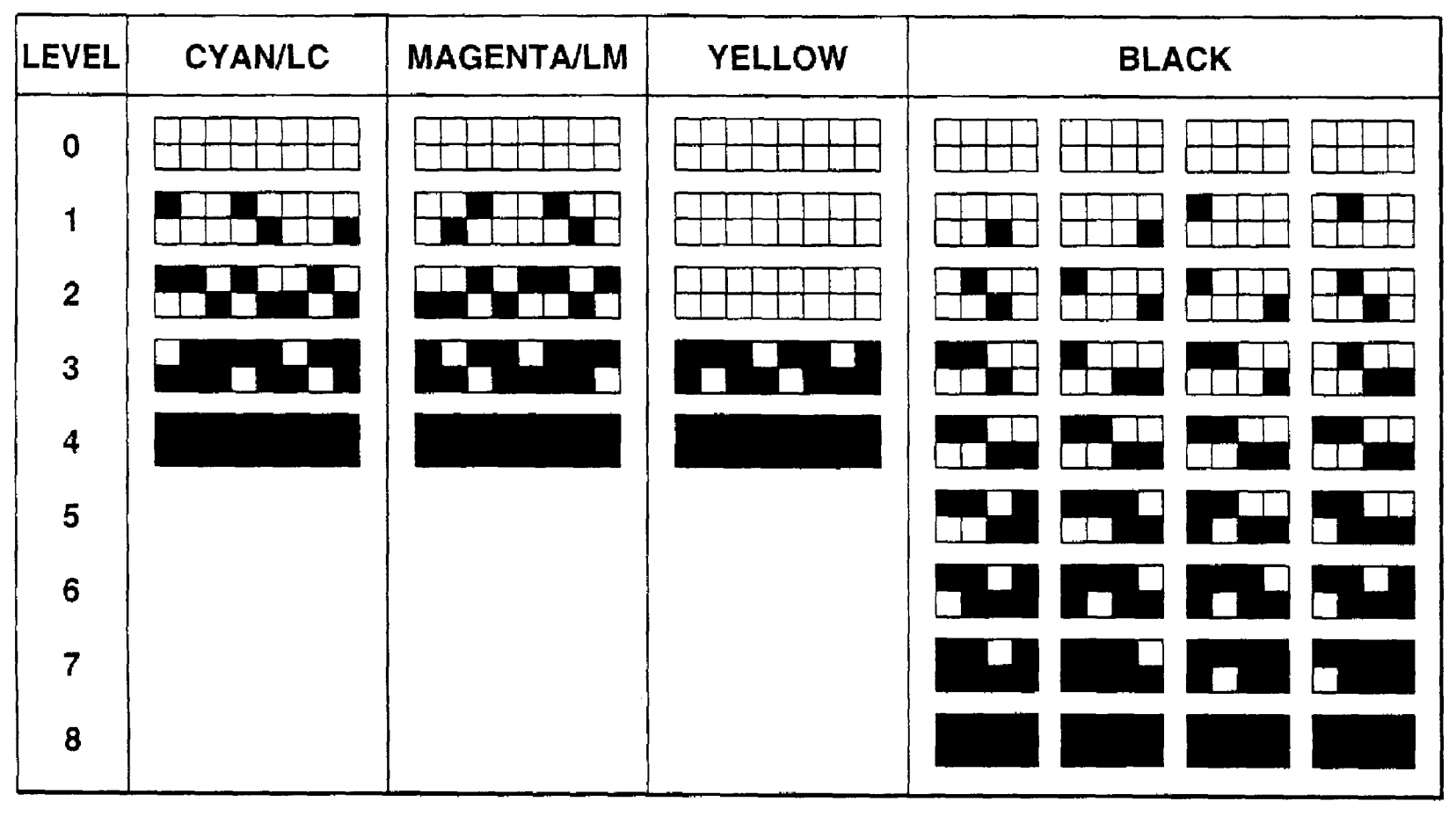

FIG. 24 illustrates an example of dot patterns for index processing in such a case. These dot patterns can be used in the same manner as in the above-described case.

The storage capacity of a memory required for storing such a table will now be compared with a case in which dot patterns for index processing having the same values are used for all color tones. In the latter case, i.e., for example, when a nine-value dot pattern table is provided for six colors, the necessary storage capacity is:

(2 dots×32 dots×8 patterns×6 colors)/8 bits=384 bytes.

On the other hand, in the case of FIG. 24, the necessary storage capacity is:

{(2 dots×32 dots×8 patterns×1 color)+(2 dots×16 dots×4 patterns×5 colors)/8 bits=144 bytes.

Accordingly, it is possible to suppress the storage capacity to about 37.5%, realize reduction in the cost of the apparatus main body, and form an image whose quality is not degraded.

As described above, according to the present invention, it is possible to appropriately set dot patterns for index processing, the recording resolution, and the amount of ink provision, in accordance with conditions, such as the color tone (the color and density) to be used, the dot diameter, the maximum amount of ink provision, the type of the print medium, and the like, and perform appropriate printing control.

12. Others

One configuration in which the present invention is effectively used is a configuration in which bubbles are formed by producing film boiling in a liquid utilizing thermal energy generated by electrothermal transducers.

A program for executing the processing of each of the above-described embodiments is not necessarily incorporated in a print apparatus in advance, but may be appropriately supplied from a printer driver of a host computer that supplies the print apparatus with image data.

A print system, in which the functions of the above-described embodiments are realized by supplying a computer within an apparatus or a system, to which various devices inclusive of a print apparatus are connected, with program codes of software or a printer driver for realizing the functions of the above-described embodiments, and operating the devices according to the program codes stored in the computer of the apparatus or the system, also constitutes the present invention.

In such a case, the program codes themselves realize the new functions of the present invention, and the program codes themselves, or means for supplying the computer with the program codes via communication or a storage medium also constitutes the present invention.

Figure 25:
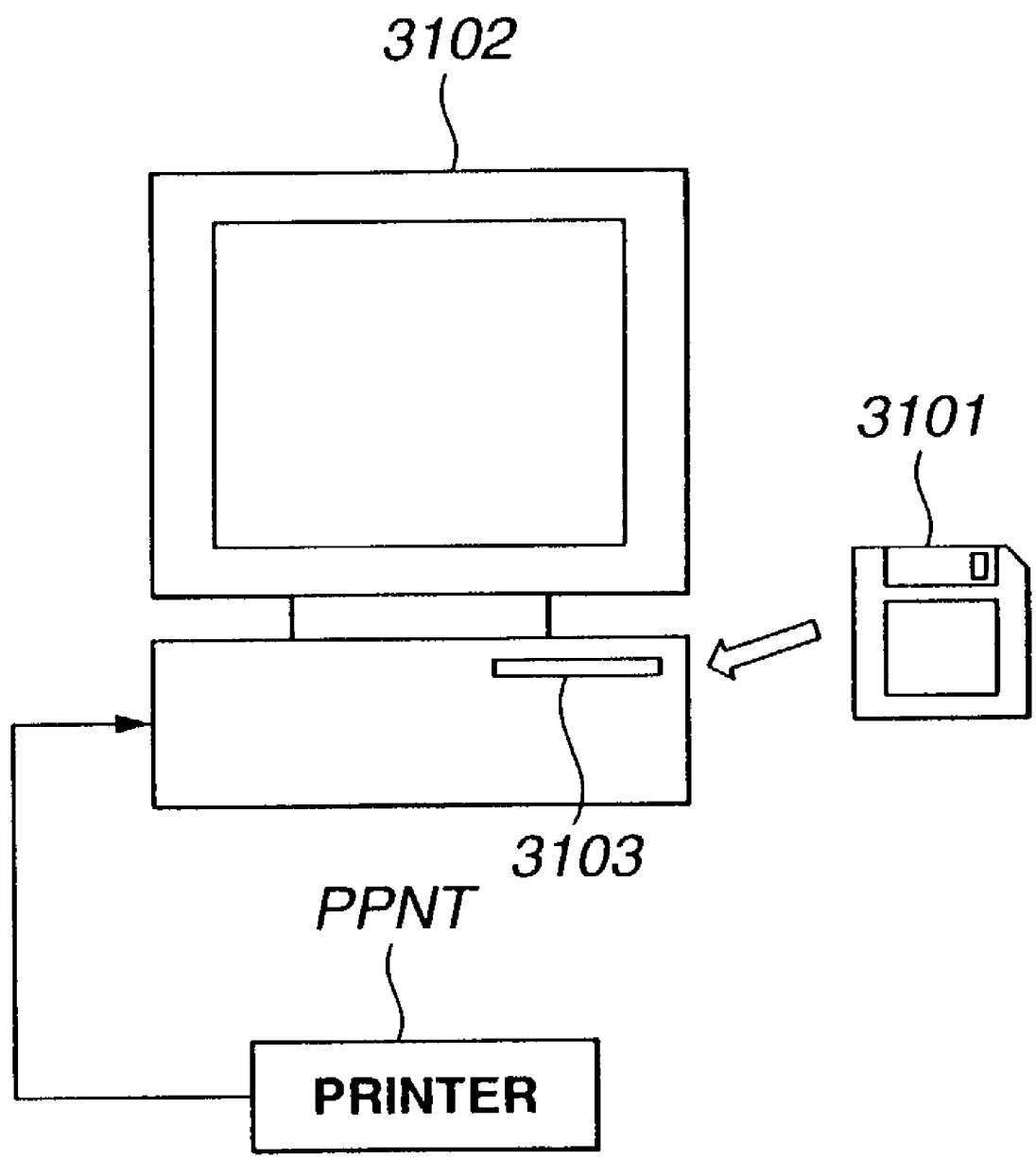
FIG. 25 is a diagram illustrating an example of concept in which a program for executing a method according to the present invention and related data are supplied from a storage medium to an apparatus.
Figure 26:
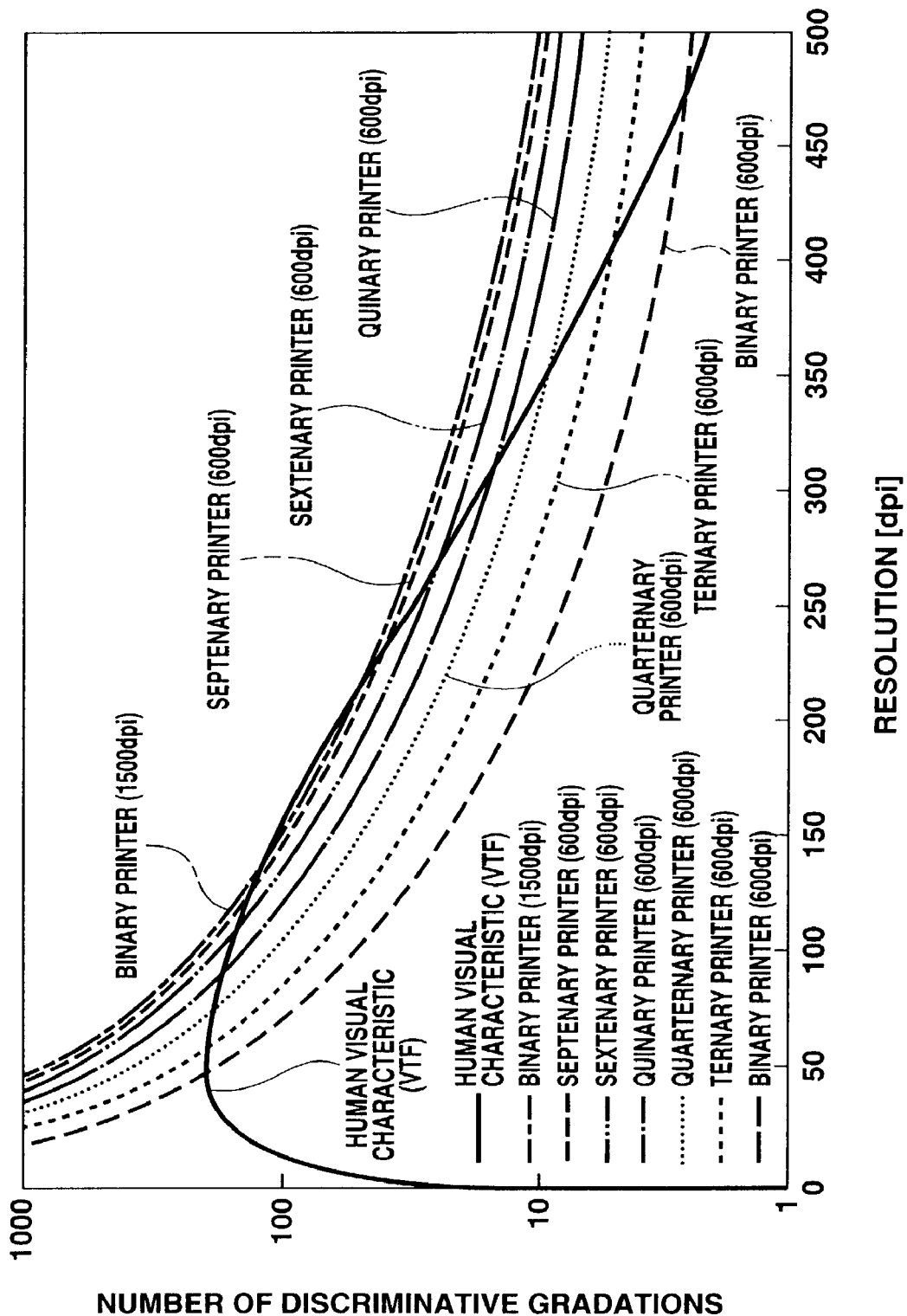
FIG. 26 is a graph illustrating the human visual characteristic (VTF curve) with respect to gradation levels.
Figure 27A:
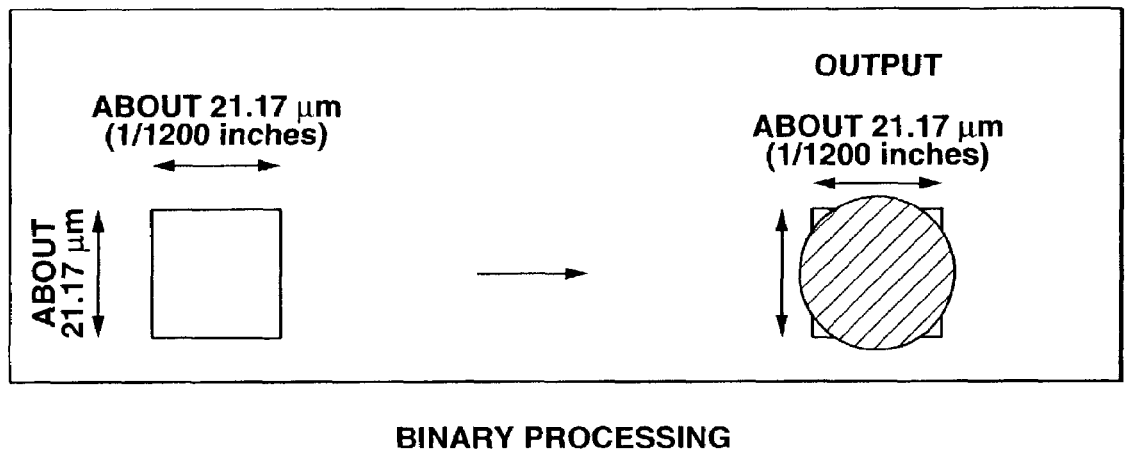
FIGS. 27A and 27B are diagrams illustrating binary processing and multivalue processing, respectively, for input image data.
Figure 27B:
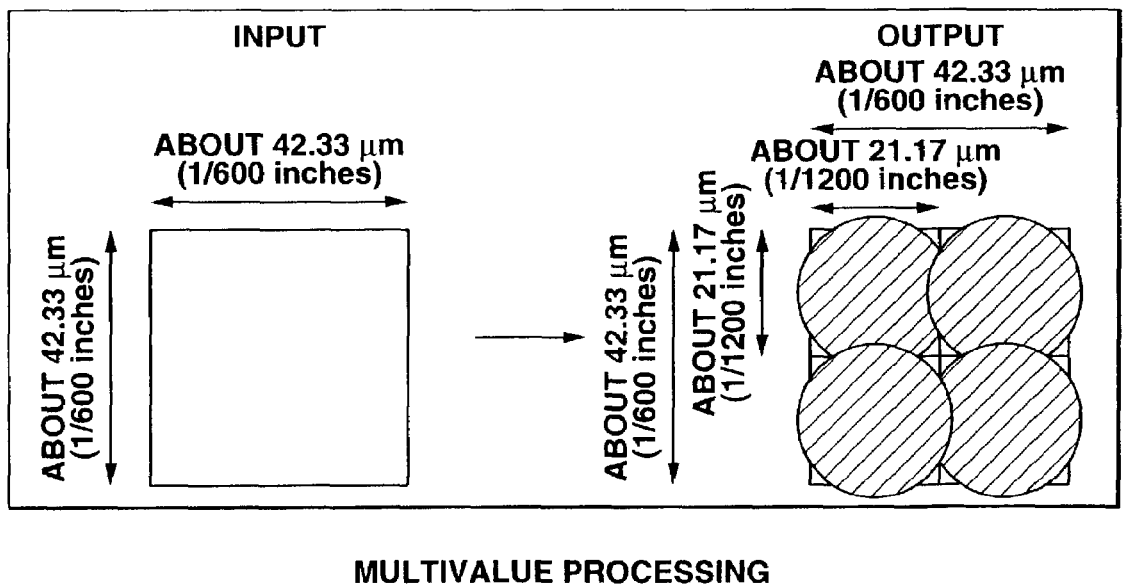

FIG. 25 illustrates an example of concept in which a program and related data for executing the present invention are supplied from a storage medium to an apparatus. The program and related data for executing the present invention are supplied by inserting a storage medium 3101, such as a floppy disk (registered trade name), a CD(compact disc)-

ROM, or the like, into a storage-medium-drive insertion port 3103 provided in an apparatus 3102, serving as a host apparatus for a printer PRNT. Then, by first installing the program and related data from the storage medium 3101 onto a hard disk, and then loading the program and related data from the hard disk into a RAM, or by directly loading the program and related data into the RAM without installing them onto a hard disk, the program and related data can be executed.

In addition to a floppy disk or a CD-ROM, for example, a hard disk, an optical disk, a magnetooptical disk, a CD-R (recordable), a magnetic tape, a nonvolatile memory card, a ROM or the like may also be used as the storage medium for supplying the program codes.

The present invention may, of course, be applied not only to a case in which the functions of the above-described embodiments are realized by executing program codes read by a computer, but also to a case in which an OS (operating system) or the like operating in a computer executes a part or the entirety of actual processing, and the functions of the above-described embodiments are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiments are realized by the processing.

As described above, according to the present invention, when performing image formation using a print head for performing dot formation in a plurality of different conditions, such as the color tone (the color and density) to be used, the dot diameter (the amount of ink discharge), the maximum amount of ink provision, the type of the print medium, and the like, dot patterns for index processing, the recording resolution, the amount of ink provision, and the like are appropriately set in accordance with the plurality of conditions. As a result, it is possible to increase the data processing speed due to reduction of the amount of data processing, and reduce the cost of the apparatus due to reduction in the memory capacity. In addition, it is also possible to optimize color processing and the number of reproduced gradation levels, achieve improvement in graininess over the entire density region, and output a very precise image.

The individual components shown in outline or designated by blocks in the drawings are all well known in the image processing apparatus and method, print apparatus and print system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus that performs image processing to print an image on a print medium using a print head capable of printing dots of a plurality of types of print materials, including deep-color print materials and light-color print materials, said apparatus comprising:

storage means for storing dot patterns, including a first set of dot patterns corresponding to a first deep-color print material, a second set of dot patterns corresponding to a second deep-color print material, a third set of dot patterns corresponding to a first light-color print material, and a fourth set of dot patterns corresponding to a second light-color print material, wherein each dot pattern corresponding to the first and second deep-color print material is associated with one of a first number of gradation levels, and a position of a pixel of the image, and each dot pattern corresponding to the first and second light-color print materials is associated with one of a second number of gradation levels greater than the first number and the position of the pixel; and selecting means for selecting a dot pattern from the dot patterns stored in said storage means, based on a corresponding gradation level and position of the pixel, wherein the first light-color print material has a same color as the first deep-color print material and has lower density than that of the first deep-color print material, and the second light-color print material has a same color as the second deep-color print material and has a lower density than that of the second deep-color print material, wherein the dot pattern corresponding to the first deep-color print material is different from the dot pattern corresponding to the second deep-color print material at the same gradation level and the same pixel position, and the dot pattern corresponding to the first light-color print material is different from the dot pattern corresponding to the second light-color print material at the same gradation level and the same pixel position, and wherein a print resolution of the dot patterns corresponding to the first and second deep-color print materials is lower than a print resolution of the dot patterns corresponding to the first and second light-color print materials.

2. An image processing apparatus according to claim 1, wherein, when the print resolution of the dot patterns corresponding to the first and second deep-color print materials is represented by X, and the print resolution of the dot patterns corresponding to the first and second light-color print materials is represented by Y, the following condition is satisfied:

$$1/Y = N/X,$$

where N is an integer.

3. A print apparatus that prints an image on a print medium using a print head, said apparatus comprising:

an image processing apparatus according to claim 1.

4. A print system comprising:

a print apparatus including an image processing apparatus according to claim 1; and a host apparatus for supplying the print apparatus with data of the pixel having the gradation level.

5. The image processing apparatus according to claim 1, wherein the first deep-color print material is a cyan ink and the first light print material is a light cyan ink, and the second deep-color print material is a magenta ink and the second light print material is a light magenta ink.

6. The image processing apparatus according to claim 1,
wherein the plurality of types of print materials include a third print material different from the first and second deep-color print materials and the first and second light-color print materials, and
wherein dot patterns corresponding to the third print material are the same as the dot patterns corresponding to one of the first and second deep-color print materials.

7. An image processing method of performing image processing to print an image on a print medium using a print head capable of printing dots of a plurality of types of print materials, including deep-color print materials and light-color print materials, said method comprising:
a selecting step of selecting a dot pattern from a storage means for storing dot patterns, including a first set of dot patterns corresponding to a first deep-color print material, a second set of dot patterns corresponding to a second deep-color print material, a third set of dot patterns corresponding to a first light-color print material, and a fourth set of dot patterns corresponding to a second light-color print material,
wherein each dot pattern corresponding to the first and second deep-color print material is associated with one of a first number of gradation levels, and a position of a pixel of the image, and each dot pattern corresponding to the first and second light-color print materials is associated with one of a second number of gradation levels greater than the first number and the position of the pixel,
wherein the selection is based on a corresponding gradation level and position of the pixel,
wherein the first light-color print material has a same color as the first deep-color print material and has lower density than that of the first deep-color print material, and the second light-color print material has a same color as the second deep-color print material and has a lower density than that of the second deep-color print material,
wherein the dot pattern corresponding to the first deep-color print material is different from the dot pattern corresponding to the second deep-color print material at the same gradation level and the same pixel position, and the dot pattern corresponding to the first light-color print material is different from the dot pattern corresponding to the second light-color print material at the same gradation level and the same pixel position, and
wherein a print resolution of the dot patterns corresponding to the first and second deep-color print materials is lower than a print resolution of the dot patterns corresponding to the first and second light-color print materials.

8. A computer readable storage medium storing a control program for causing a computer to execute an image processing method according to claim 7.

* * * * *

UNITED STATES PATENT AND TRADEMARK OFFICE
CERTIFICATE OF CORRECTION

PATENT NO. : 7,385,730 B2
APPLICATION NO. : 10/198108
DATED : June 10, 2008
INVENTOR(S) : Takayuki Ogasahara et al.

It is certified that error appears in the above-identified patent and that said Letters Patent is hereby corrected as shown below:

COLUMN 6:
    Line 58, "deep" should read -- deep color --; and
    Line 58, "light" should read -- light color --.

COLUMN 7:
    Line 18, "and 20B" should read -- and 21B --.

COLUMN 9:
    Line 19, "cartridge H1001" should read -- cartridge H1000 --.

COLUMN 10:
    Line 27, "1500" should read -- H1500 --.

COLUMN 12:
    Line 1, "carriage M1400" should read -- carriage M4001 --.

COLUMN 16:
    Line 19, "body 1000" should read -- body M1000 --.

COLUMN 18:
    Line 29, "600 ppi," should read -- 600 dpi, --.

COLUMN 24:
    Line 12, In the formula "dots × 4 patterns × 4 colors)/8 bits=192 bytes." should read
    -- dots × 4 patterns × 4 colors)}/8 bits=192 bytes --;
    Line 23, "solution" should read -- resolution --;
    Line 27, "solution" should read -- resolution --; and
    Line 34, "No. 2002-29079" should read -- No. 2002-29097 --.

COLUMN 25:
    Line 10, "of" should read -- if --; and
    Line 12, "direction XX the" should read -- direction X × the --.

Signed and Sealed this

Twenty-seventh Day of July, 2010

David J. Kappos
*Director of the United States Patent and Trademark Office*

COLUMN 26:
    Line 1, "ink 2 × 4" should read -- ink 2 × 2 --; and
    Line 23, In the formula "dots × 4 patterns × 5 colors)/8 bits=144 bytes." should read -- dots × 4 patterns × 5 colors)}/8 bits=144 bytes --.

COLUMN 28:
    Line 64, "light" (first occurrence) should read -- light–color --; and
    Line 66, "light" (first occurrence) should read -- light–color --.

COLUMN 29:
    Line 23, "material" should read -- materials --.